(12) United States Patent
Sugikawa et al.

(10) Patent No.: US 7,076,209 B2
(45) Date of Patent: Jul. 11, 2006

(54) SHORT RANGE RADIO COMMUNICATION SYSTEM WITH USING IMPROVED AUTHENTICATION SCHEME

(75) Inventors: Akihiko Sugikawa, Kanagawa (JP); Yutaka Sata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 548 days.

(21) Appl. No.: 10/377,789

(22) Filed: Mar. 4, 2003

(65) Prior Publication Data

US 2004/0203384 A1    Oct. 14, 2004

(30) Foreign Application Priority Data

Mar. 4, 2002  (JP)  ............................. 2002-057778
Sep. 25, 2005  (JP)  ............................. 2002-279603

(51) Int. Cl.
*H04B 7/00*    (2006.01)
(52) U.S. Cl. ....................... 455/41.2; 455/41.1; 455/88; 455/454; 370/463; 370/465; 370/466; 370/469
(58) Field of Classification Search .............. 455/41.1, 455/41.2, 88, 454; 370/463, 465, 466, 469
See application file for complete search history.

(56) References Cited

U.S. PATENT DOCUMENTS 6,782,241 B1 *  8/2004  Kobayashi .................. 455/88
2002/0037699 A1 *  3/2002  Kobayashi et al. ........... 455/41
2003/0114176 A1 *  6/2003  Phillipps ..................... 455/500

FOREIGN PATENT DOCUMENTS

| JP | 2001-144781 | 5/2001 |
| JP | 2002-76977 | 3/2002 |
| JP | 2002-109039 | 4/2002 |
| JP | 2002-271874 | 9/2002 |

OTHER PUBLICATIONS

U.S. Appl. No. 10/377,789, filed Mar. 4, 2003, Sugikawa et al.
U.S. Appl. No. 10/774,411, filed Feb. 10, 2004, Sugikawa.
U.S. Appl. No. 10/776,275, filed Feb. 12, 2004, Sata et al.
U.S. Appl. No. 10/767,369, filed Jan. 30, 2004, Sata et al.
U.S. Appl. No. 10/699,892, filed Nov. 4, 2003, Sugikawa.
U.S. Appl. No. 09/932,873, filed Aug. 21, 2001, Sugikawa et al.

\* cited by examiner

*Primary Examiner*—Matthew D. Anderson
*Assistant Examiner*—Sanh Phu
(74) *Attorney, Agent, or Firm*—Oblon, Spivak, McClelland, Maier & Neustadt, P.C.

(57) ABSTRACT

In a communication system having a first communication device and a second communication device for carrying out communications by setting up a communication link, the identification code generated at one of the first and second communication devices is presented to the other, and the authentication data are generated by using this identification code at the both of the communication devices, so that the illegal acquisition of the identification code can be prevented and the security performance can be improved.

3 Claims, 16 Drawing Sheets

PORTABLE TERMINAL OF 2ND EMBODIMENT

CASH REGISTER APPLICATION WITH BLUETOOTH

SHORT RANGE RADIO COMMUNICATION SYSTEM WITH USING IMPROVED AUTHENTICATION SCHEME

BACKGROUND OF THE INVENTION

1. Field of the Invention

The present invention relates to a communication system, a radio communication terminal and a radio communication device, for setting up a communication link while carrying out an authentication processing, which are directed to the case of carrying out transmission/reception of information by a short range radio communication such as Bluetooth between the radio communication terminal and the radio communication device, for example.

2. Description of the Related Art

Recently, the short range radio communication scheme having a transmission range of about 10 m has been attracting much attention. In contrast to the conventional radio LAN which has an effective transmission range of over 100 m, the short range radio communication scheme requires a smaller power consumption because of the short transmission range, so that it is suitable for an information processing device with a limited battery capacity such as a portable telephone.

The Bluetooth is one such short range radio communication scheme, and the portable information processing device (referred hereafter simply as a portable terminal) such as a portable telephone, a PDA, etc., which is equipped with a communication function according to this Bluetooth has been gaining increasingly popularity in recent years. For further details of the Bluetooth, the detailed specification can be obtained from the Web site "http://www.bluetooth.org/".

When the Bluetooth becomes widespread, it becomes possible to provide a service suitable for each location, at any location. For example, at the convenience store, supermarket or retail store, it is possible to realize services for the benefit of purchasers such as an electronic coupon service, an electronic point service, an electronic payment, an electronic receipt, an electronic acknowledgement issuance, etc. Furthermore, applications to a gate controlling using an electronic ticket, payment and discount at the automatic vending machine, an information delivery, a road guidance, etc. are expected.

In the following, an exemplary case where a connection according to the Bluetooth is set up between a portable terminal equipped with the communication function according to the Bluetooth (hereafter simply referred to as a Bluetooth portable terminal) and an information communication device equipped with the Bluetooth (hereafter referred to as a Bluetooth device), and the Bluetooth device provides a service to a user who owns the portable terminal will be described.

The Bluetooth uses a frequency band that is open to public for commercial use, so that it can be easily obstructed by other devices using the same frequency band. For this reason, the Bluetooth employs the frequency hopping technique for periodically changing the utilized frequency so as to be less vulnerable to the obstruction from the other devices. In the frequency hopping, there is a need for an initial operation to establish synchronization between two devices for carrying out communications.

At a time of searching the other Bluetooth devices existing in its communication area, the portable terminal uses the Bluetooth device search function to sequentially scan through the predetermined frequency band and discover the Bluetooth devices that are standing by in an accessible state.

The Bluetooth device in the accessible state that received a search signal transmits a clock information along with its own terminal identification information to a search signal sender. The Bluetooth device in the accessible state is also periodically changing the utilized frequency, so that it takes several seconds before the frequencies coincide. Even under the ideal condition of having no radio communication device using the same frequency in a vicinity, it may take five seconds or more to discover one terminal depending on the circumstance. In the case where the device using the same frequency exists in a vicinity, it can possibly take even longer time.

The portable terminal collects a terminal identification information in 48 bits from each one of the discovered Bluetooth devices, and carries out the synchronization of the frequency hopping pattern with a desired (selected) Bluetooth device at a connection phase by using the clock information and 28 bits out of the terminal identification information of that Bluetooth device. After the hopping pattern is synchronized, a physical link is established, and thereafter layers are connected so that the exchange and setting of necessary parameters are carried out, and then it becomes possible to carry out the data exchange at the application level. The mutual authentication is carried out if necessary, and when the connection at the application level is established, the Bluetooth device provides a prescribed service.

In general, in comparison with the communication utilizing infrared rays, the radio communication has an advantage in that it is not affected by the positional relationship or obstacles between two devices, but it also has a property that it is difficult to set up a connection only with a terminal existing at a specific location.

This fact gives rise to the following problems. In the following, an exemplary case where a user who has the electronic coupon in the portable terminal uses that electronic coupon by carrying out communications with a cash register equipped with the Bluetooth communication function at a time of payment at a cash register of the convenience store will be considered.

In the case where only one customer (only one portable terminal) and only one cash register (only one Bluetooth device) are present, the relationship between the portable terminal of the customer who makes the payment and the cash register is uniquely determined so that no problem regarding the connection arises. In other wards, when a person who operates the portable terminal discovers the Bluetooth device by using the Bluetooth device search function described above, the discovered device can be regarded as the cash register to which the payment is to be made.

However, when a plurality of cash registers exist, the cash register of the next line will also be discovered, so that there is a need for the user who has the portable terminal to select the one cash register to which the payment is to be made from the discovered cash registers, by checking a name of the cash register or the like.

Also, in the case where the other customer waiting for his turn to make the payment also has a portable terminal, there is a possibility for the portable terminal of the other customer to make the connection with the cash register before the portable terminal of the customer currently in his turn to make the payment.

For this reason, there is a need for an operator of the cash register to check the customer if the connection is made with a right portable terminal or not, by using some information associated with the portable terminal.

Such selection and checking operations do not constitute a good interface for the customer who makes the payment and they also hinder the register operation of the operator.

Moreover, if the person operating the portable terminal specifies the wrong cash register, there can be troubles such as the amount to be paid is not discounted despite of the use of the coupon, or the points granted to the one customer are actually added to the other customer. The cancellation operation must be carried out at both the portable terminal and the cash register, which requires considerable time and effort.

In addition, in the system using radio, anyone can be accessible to the radio communications, so that there can possibly be a problem related to business obstruction and privacy due to an attack from a malicious user such as setting up a link earlier than an innocent user to prevent the innocent user to make the connection, or pretending the cash register to secretly acquire the personal information or steal coupons, etc.

Thus, conventionally, it has been difficult to establish one-to-one correspondence between the portable terminal and the Bluetooth device correctly, easily and quickly, by using the short range radio communications.

BRIEF SUMMARY OF THE INVENTION

It is therefore an object of the present invention to provide a communication system, a radio communication terminal and a radio communication device, capable of improving the security performance without complicating the authentication procedure.

According to one aspect of the present invention there is provided a communication system comprising a first communication device and a second communication device for carrying out communications by setting up a communication link between the first communication device and the second communication device, wherein: the first communication device has; a first identification acquisition unit configured to acquire an identifier for communication possessed by the first communication device; a first identifier generation unit configured to generate an identifier for presentation according to at least a part of bits of the identifier for communication; a display control unit configured to display the identifier for presentation at a display unit of the first communication device; and a connection mode setting unit configured to set the first communication device in a mode for receiving a connection request from the second communication device, after the identifier for presentation is displayed at the display unit; and the second communication device has: a second identifier acquisition unit configured to acquire the identifier for presentation displayed at the display unit; a second identifier generation unit configured to generate the identifier for communication according to the identifier for presentation acquired by the second identifier acquisition unit; and a connection request unit configured to make the connection request to the first communication device according to the identifier for communication generated by the second identifier generation unit.

According to another aspect of the present invention there is provided a communication system comprising a first communication device and a second communication device for carrying out communications by setting up a communication link between the first communication device and the second communication device, wherein: the first communication device has: a first identification acquisition unit configured to acquire an identifier for communication possessed by the first communication device; a first identifier generation unit configured to generate an identifier for presentation according to at least a part of bits of the identifier for communication; a display control unit configured to display the identifier for presentation at a display unit of the first communication device; a search unit configured to search out the second communication device that acquired the identifier for presentation, after the identifier for presentation is displayed at the display unit; and a connection request unit configured to make a connection request to the second communication device searched out by the search unit; and the second communication device has: a second identifier acquisition unit configured to acquire the identifier for presentation displayed at the display unit; a second identifier generation unit configured to generate the identifier for communication according to the identifier for presentation acquired by the second identifier acquisition unit; and a connection request permission judgement unit configured to judge whether the connection request from the first communication device should be permitted or not, by comparing the identifier for communication of the first communication device that made the connection request and the identifier for communication generated by the second identifier generation unit.

According to another aspect of the present invention there is provided a radio communication terminal for setting up a communication link with a correspondent radio communication device, the radio communication terminal comprising: an identification acquisition unit configured to acquire an identifier for communication possessed by the radio communication terminal; an identifier generation unit configured to generate an identifier for presentation according to at least a part of bits of the identifier for communication; a display control unit configured to display the identifier for presentation at a display unit of the radio communication terminal; and a connection mode setting unit configured to set the radio communication terminal in a mode for receiving a connection request from the correspondent radio communication device, after the identifier for presentation is displayed at the display unit.

According to another aspect of the present invention there is provided a radio communication device for setting up a communication link with a radio communication terminal, the radio communication device comprising: an identifier acquisition unit configured to acquire an identifier for presentation of the radio communication terminal that is displayed at a display unit of the radio communication terminal; an identifier generation unit configured to generate an identifier for communication of the radio communication terminal according to the identifier for presentation acquired by the identifier acquisition unit; and a connection request unit configured to make a connection request to the radio communication terminal according to the identifier for communication generated by the identifier generation unit.

According to another aspect of the present invention there is provided a radio communication terminal for setting a communication link with a correspondent radio communication device, the radio communication terminal comprising: an identification acquisition unit configured to acquire an identifier for communication possessed by the radio communication terminal; an identifier generation unit configured to generate an identifier for presentation according to at least a part of bits of the identifier for communication; a display control unit configured to display the identifier for presentation at a display unit of the radio communication terminal; a search unit configured to search out the correspondent radio communication device that acquired the identifier for presentation, after the Identifier for presentation is displayed at the display unit; and a connection request unit configured to make a connection request to the correspondent radio communication device searched out by the search unit.

According to another aspect of the present invention there is provided a radio communication device for setting up a communication link with a radio communication terminal, the radio communication device comprising: an identifier acquisition unit configured to acquire an identifier for presentation of the radio communication terminal that is displayed at a display unit of the radio communication terminal; an identifier generation unit configured to generate an identifier for communication of the radio communication terminal according to the identifier for presentation acquired by the identifier acquisition unit; and a connection request permission judgement unit configured to judge whether a connection request from the radio communication terminal should be permitted or not, by comparing the identifier for communication of the radio communication terminal that made the connection request and the identifier for communication generated by the identifier generation unit.

Other features and advantages of the present invention will become apparent from the following description taken in conjunction with the accompanying drawings.

DETAILED DESCRIPTION OF THE INVENTION

In the following, the embodiments of the present invention will be described in details with references to the drawings.

First Embodiment

Figure 1:
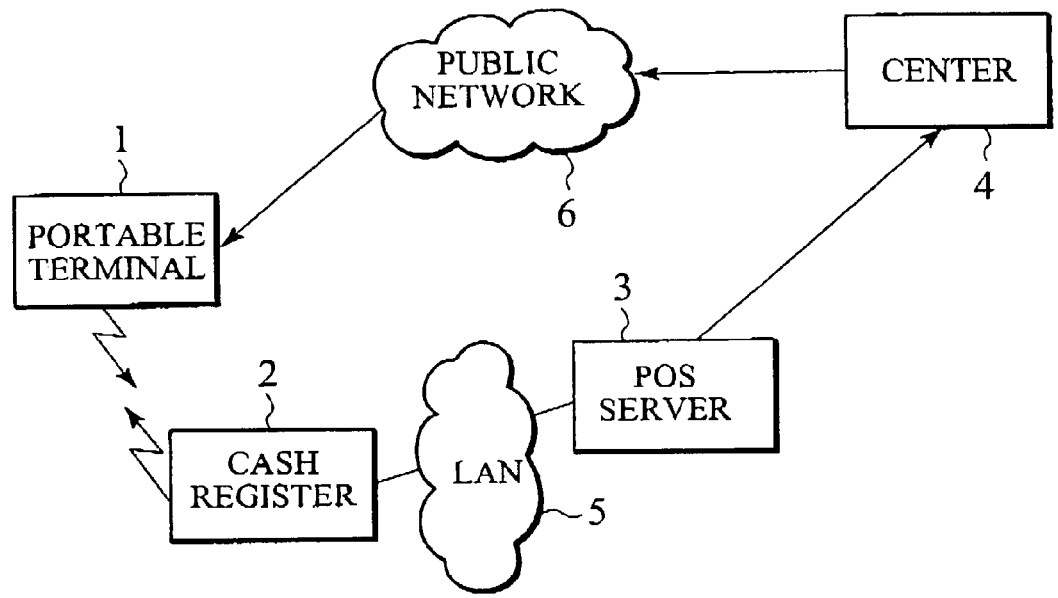
FIG. 1 is a block diagram showing a schematic configuration of a communication system according to the present invention.

FIG. 1 shows a schematic configuration of a communication system according to the first embodiment of the present invention, in an exemplary form of a POS (Point Of Sales) system. The communication system of FIG. 1 has a portable terminal 1 owned by a customer, a cash register 2 for carrying out short range radio communications with this portable terminal 1, a POS server 3 for managing information on sales made by the cash register 2, and a center 4 for providing various services to each customer.

The cash register 2 and the POS server 3 are connected through a LAN 5, the POS server 3 and the center 4 are connected through a public network (or dedicated line) 6, and the center 4 and the portable terminal 1 owned by each customer are connected through a public radio network. The portable terminal 1 and the cash register 2 carry out communications according to the specification of the Bluetooth, for example.

The POS server 3 manages the sold product names, sold prices, and the sold amounts, according to the sales information of the cash register 2, and carries out the inventory management and the popular product classification.

The center 4 provides various services to each customer according to the information collected and managed by the Pos server 3. More specifically, the analysis of the customer's purchase record and the customer's point of contact are checked by utilizing the customer ID, and information that is expected to be of interest of the customer is provided as e-mail or direct mail through the public radio network, or electronic coupons or electronic points are issued according to the customer's purchase record. The center 4 also carries out the management of the electronic points possessed by each customer.

The POS server 3 and the center 4 are storing the electronic coupons (coupon information) and the electronic points (point information), and transmits these electronic coupons or electronic points to the cash register 2 or the portable terminal 1 of the customer according to the need.

The electronic coupon is an information by which the price of the specific goods can be discounted, which is formed by information such as a store name, an identifier of goods, a discount amount, and an expiration time, for example. It is assumed that the electronic coupon is acquired in advance from the public network or the cash register 2 in the case of the prepayment, and stored in the portable terminal 1 (EEPROM 14, for example) of the customer. The customer can receive the service such as discount by transmitting the electronic coupon from the portable terminal 1 to the cash register 2 at a time of the payment.

The electronic point is an information containing a score that is granted at each payment of a prescribed amount, such as one point per each payment of ¥100, for example. It is assumed that a packet of the electronic point formed by information such as a store name, a score, and an expiration time, for example, is transmitted from the cash register 2 to the portable terminal 1 of the customer by the communication using the Bluetooth at a time of the payment, and stored in the portable terminal 1 (EEPROM 14, for example) of the customer.

When the score of the electronic points reaches a certain number, the customer can receive the service corresponding to the score (such as a mailing of a desired gift, a delivery of electronic coupons, etc.) by making a request to the center 4 through the public network 6 or through the communication using the Bluetooth with the cash register 2.

Note that the log of providing service using the electronic coupons and the electronic points made through the cash register 2 or by a request to the center 4 is also recorded as a customer information at the POS server 3, and utilized for the analysis of the individual preferences. The customer information can also be utilized for the isuing of the electronic coupons suitable for each customer, and the advertisement of new products.

Figure 2:
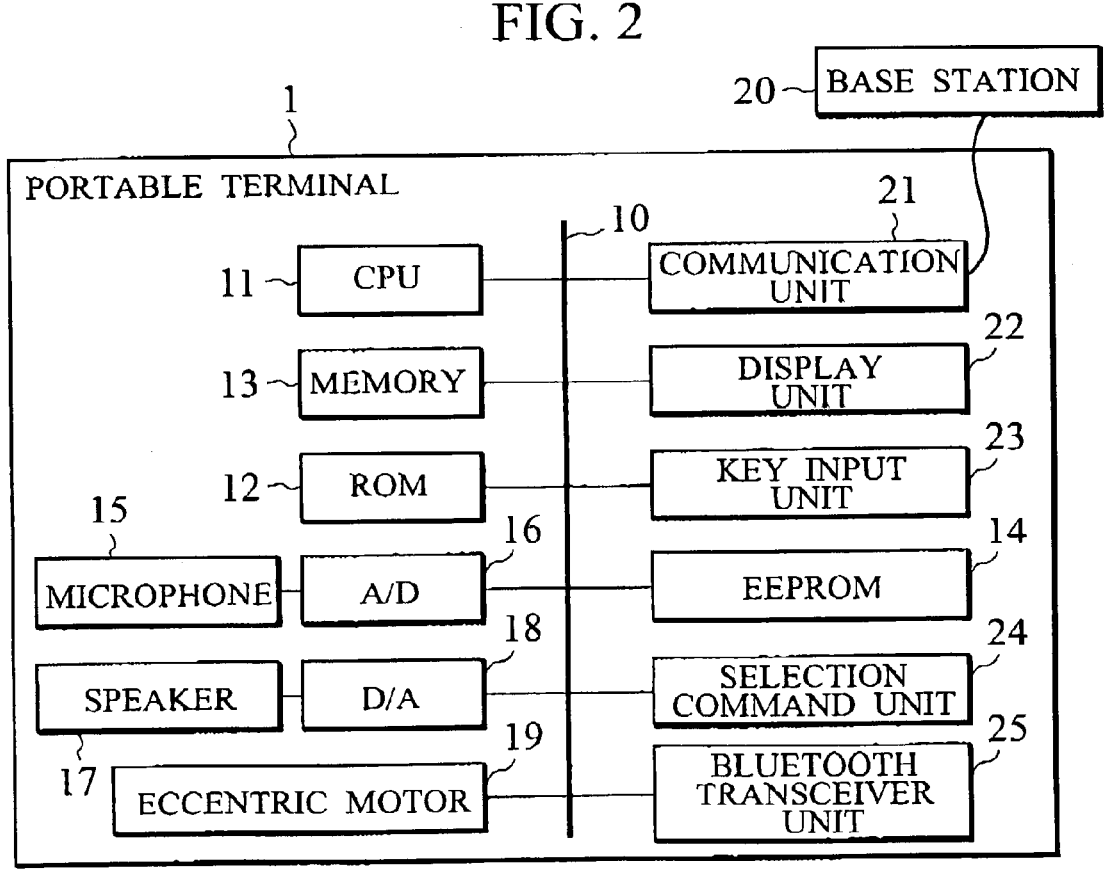
FIG. 2 is a block diagram showing an internal configuration of a portable terminal according to the first embodiment of the present invention.

FIG. 2 snows an internal configuration of the portable terminal 1 in this embodiment. The portable terminal 1 of FIG. 2 has a CPU 11 for executing prescribed programs, a ROM 12 for storing programs and dictionary data, a memory 13 for storing tentative variables and data, an EEPROM 14 for storing personal registration information and electronic coupons, etc., an A/D converter 16 for converting speech signals entered at a microphone 15 into digital signals, a D/A converter 18 for converting digital signals into speech signals to be outputted from a speaker 17, an eccentric motor 19 for vibrating a casing, a communication unit 21 for carrying out communications with a base station 20, a display unit 22 for displaying various information, a key input unit at which the customer inputs characters, a selection command unit 24 for carrying out a menu selection, etc., and a Bluetooth transceiver unit (which will be referred to as BT transceiver unit in the following) 25, all of which are connected through a bus 10.

Figure 5:
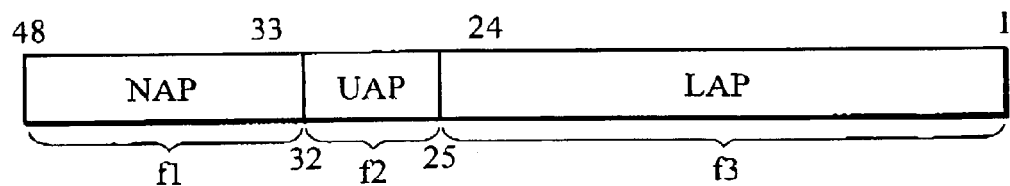
FIG. 5 is a diagram showing an identifier of a Bluetooth terminal that is used in the first embodiment of the present invention.

The BT transceiver unit 25 has an antenna for carrying out radio communications in 2.4 GHz band, a baseband unit, and a protocol control unit for controlling protocol such as L2CAP (Logical Link Controlled Adaptation Protocol) as described in the Bluetooth specification Version 1.0, for example. Else, there can be cases where the protocol of the Bluetooth is loaded on the RAM of the portable terminal 1 and executed, similarly as in the POS terminal. A terminal (device) compatible with the Bluetooth is assigned with a globally unique identification information in 48 bits. This identification information is stored in the BT transceiver unit 25, and can be read out according to the need from the CPU 11. These 48 bits are composed of three fields f1, f2 and f3 as shown in FIG. 5.

The field f1 is LAP (Lower Address Part) in 24 bits, the field f2 is UAP (Upper Address Part) in 8 bits, and the field f3 is NAP (Non-significant Address Part) in 16 bits.

24 bits of NAP and UAP is an ID unique to the manufacturer called Organizationally Unique Identifiers (OUIs) which is managed to be unique by the IEEE, and each manufacturer obtains its own number by making a request to the IEEE. 24 bits of LAP is freely assigned by each manufacturer to make it unique, except for some addresses (0x9E8B00-0x9E8B3F).

The BT transceiver unit 25 carries out transmission and reception of data for receiving the customer services using the electronic coupons (coupon information) or the electronic points (point information) stored in the memory 13 and the EEPROM 14, by establishing a radio communication path with the cash register 2, for example.

The configuration regarding the speech communications in the portable terminal 1 is the same as the conventional portable telephone, where the communication unit 21 carries out transmission and reception of data, by carrying out a location registration and a call control at times of call origination and call termination with the base station 20, a call control for disconnection when the communication is finished, and a handover during the communication.

When a connection request is received from the base station 20, the communication unit 21 calls attention of the customer who is the owner of the portable terminal 1, by outputting a calling sound from the speaker 17 or vibrating the casing of the portable terminal 1 by driving the eccentric motor 19. After the connection admission command of the customer, the carrier makes the channel connection between two locations and starts the communication.

At a time of the communication, the portable terminal 1 converts the speeches entered at the microphone 15 from the analog signals to the digital signals at the A/D converter 16, carries out the compression processing of the digital data under the control of the CPU 11, and transmits them to a nearby base station through the communication unit 21. Also, the signals received at the communication unit 21 are applied with the decompression processing to recover the original signals under the control of the CPU 11, converted from the digital signals to the analog signals at the D/A converter 18, and outputted from the speaker 17.

Besides the speech communications, the portable terminal 1 has a function for carrying out the packet communications using the communication unit 21, downloading a program from a specific server, and executing it according to a command of the terminal owner, by executing a virtual machine of JAVA (registered trademark).

Figure 3:
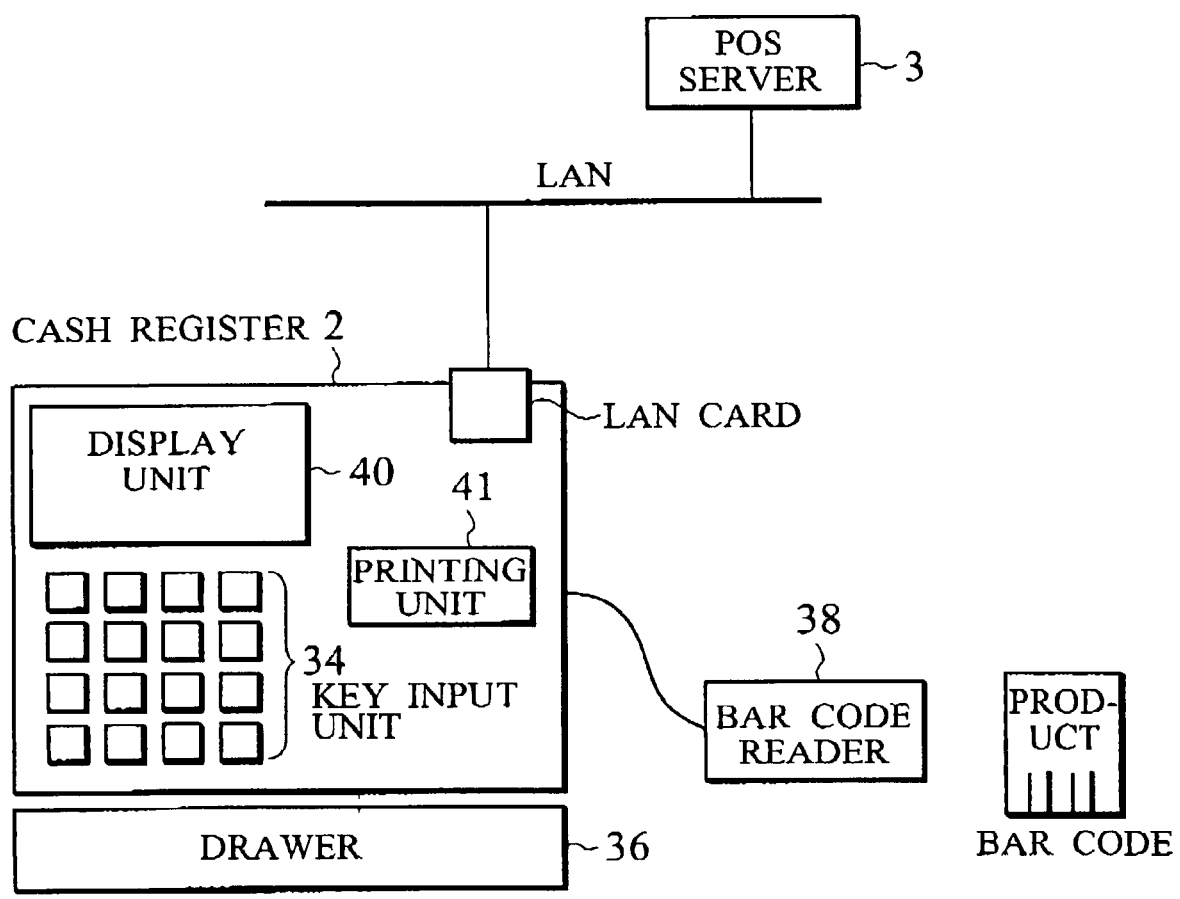
FIG. 3 is a diagram showing a schematic configuration of a cash register according to the first embodiment of the present invention.
Figure 4:
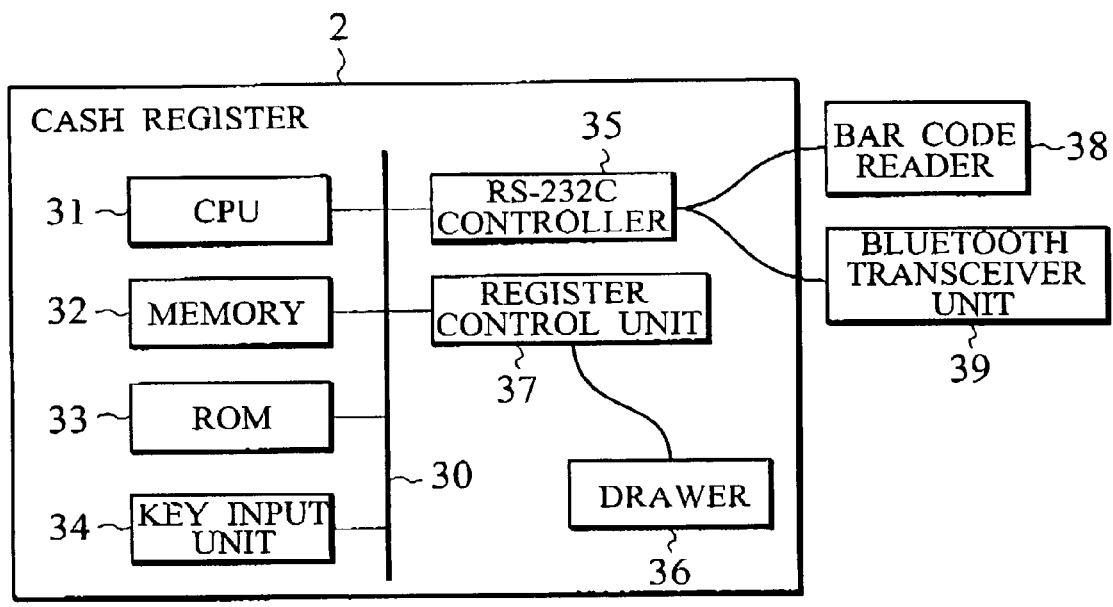
FIG. 4 is a block diagram showing an internal configuration of the cash register according to the first embodiment of the present invention.

FIG. 3 shows a schematic configuration of the cash register 2 in this embodiment, and FIG. 4 shows an internal configuration of the cash register 2 in this embodiment. The cash register 2 of this embodiment has a CPU 31, a memory 32, a ROM 33, a key input unit for inputting goods prices, etc., an RS-232C controller 35, and a register control unit 37 for controlling a drawer 36, etc., all of which are connected through a bus 30. A bar code reader 38 and a BT transceiver unit 39 are connected to the RS-232C controller 35.

On a front panel of the cash register 2, a display unit 40 and a printing unit 41 are provided besides the key input unit 344, as shown in FIG. 3.

The cash register of this embodiment reads a company code, a goods code, etc., recorded in the bar code printed or pasted on the goods by the bar code reader 38, and inquires the price of that goods to the POS server 3 connected to the cash register 2 through a LAN card and the LAN 5. When the price information is received from the POS server 3, the total charge is calculated by multiplying that price information with a number of goods entered at the key input unit 34. Then, either the total charge alone or a price of each goods and the total charge are outputted at the display unit 40, and a receipt is issued at the printing unit 41, while sending the purchase log information of that goods to the POS server 3. The POS server 3 stores the purchase log information, and utilize it later on for the goods sales management, the inventory management, etc.

FIG. 4 shows an exemplary case of connecting the BT transceiver unit 39 to the internal bus 30 through the RS-232C controller 35, but it is not absolutely necessary to connect the transceiver unit 39 through the RS-232C controller 35 and it may be directed connected to the internal bus 30 or it may be connected through a USB (Universal Serial Bus). However, by connecting it through the RS-232C controller, the cash register 2 of this embodiment can be realized by making only a minor modification to the general purpose cash register.

The BT transceiver unit 39 is formed by an antenna for carrying out radio communications in 2.4 GHz band, an RF unit, a baseband unit, and a protocol control unit for controlling protocol such as L2CAP and RFCOMM as described in the Bluetooth specification Version 1.0, for example, The CPU 31 issues the Bluetooth control commands and the data transmission and reception commands to the BT transceiver unit 39, by using commands and events depending on the implementation.

Else, the BT transceiver unit 39 transmits an HCI (Host Controller Interface) command defined in the Bluetooth specification, and receives an event as a result of it, for example. It is also possible to use a configuration in which the Bluetooth protocol is loaded into the memory 32 and executed by the CPU 31, along with the application program for carrying out the register processing and the application program for providing services to the customers. In the case of such a configuration, it is not absolutely necessary to connect the BT transceiver unit 39 to the host through RS-232C controller, and it may be connected directly to the internal bus of the host, or it may be connected through USB (Universal Serial Bus), for example. By making it connectable through the RS-232C controller, it can easily be adapted to the existing cash register.

In the following, the Bluetooth connection method will be described briefly. First, the inquiry phase for discovering a correspondent device which is capable of carrying out communications is executed. A side that carries out the inquiry and the paging is referred to as a master, and a side that carries out the inquiry scan and a paging scan is referred to as a slave. Only the slave terminal that is set in the inquiry scan state responds to the inquiry from the master.

The master broadcasts an IQ packet for usually 10 seconds to the surrounding, in order to carry out the inquiry. The IQ packet contains an IAC (Inquiry Access Code), and the discovery of all or specific devices is carried out by using this code. The slave that received the IQ packet that contains IAC related to the own device stands by for a randomly determined period of time, and when the IQ packet is received again, the slave returns attributes such as Bluetooth address, clock and device class of the slave, to the master.

When the collection of the slave information is finished, the communication target device is selected according to a command of the terminal owner, and the transition to the paging phase for establishing a link level connection is made. In the paging phase, the slave is switched to the channel frequency hopping pattern calculated according to the Bluetooth address and the clock information of the master, by acquiring the clock information of the master.

First, the master estimates the paging scan hopping frequency of the slave by using 24 bits of LAP and the lower 4 bits of UAP of the slave and the clock of the slave as parameters, and transmits an ID packet for paging with respect to the estimated frequency and its surrounding frequencies. The master specifies the slave by making the ID packet that contains DAC (call up access code) calculated by using 24 bits of LAP of the Bluetooth address of the slave.

When the slave in the paging scan state receives the ID packet transmitted by the master, the slave transmits the identical ID packet to the master.

Next, the master transmits an FHS packet to the slave, the FHS packet transmitted by the master has an error detection code CRC in 16 bits attached thereto. For the initial value in calculating the CRC, 8 bits of UAP of the Bluetooth address of the slave are used.

As The slave that received the FHS packet transmits the ID packet again to the master, the master confirms that the slave has received the information, and the master and the slave are both switched to the channel frequency hopping pattern.

Then, the connection procedure at the link level and the parameter configuration at the link level are carried out to complete the connection. The procedure up to this point is realized by the protocol called LMP, and after the completion of the link level connection generation, the connection and the parameter configuration of the upper level protocols such as L2CAP and RFCOMM are sequentially carried out, and finally, the connection at the application level is generated.

Usually, the information of the correspondent terminal acquired by the above described inquiry phase, and the frequencies of the master and the slave are synchronized by using the acquired information at the paging phase, to establish a link.

However, in the case where the Bluetooth information of the correspondent is already known, it is possible to start the processing from the paging phase by directly specifying the Bluetooth address of the correspondent. In this case, there is no inquiry phase so that approximately 10 seconds of time required for the search of the correspondent can be skipped.

When the clock information of the slave is estimated correctly, it is possible to make the connection in short time, but in the case where the estimation of the clock information of the slave is incorrect or in the case where there is no clock information so that the estimation is made by using a default value of the Bluetooth. It takes an extra time of 1.28 seconds or 2.56 seconds for matching with the waiting frequency of the slave.

However, even when there is no clock information, the time can be shortened by the adjustment of parameters such as making the paging scan interval shorter and the scan window longer, or changing the paging scan mode.

As the paging phase and the connection phase are realized by such a procedure, the link level connection can be established between two devices. Also, the minimum required parameters of these phases are 32 bits (LAP-UAP) of the Bluetooth address or the slave. If the clock of the slave is available, the time required for the paging can be shortened.

Figure 6:
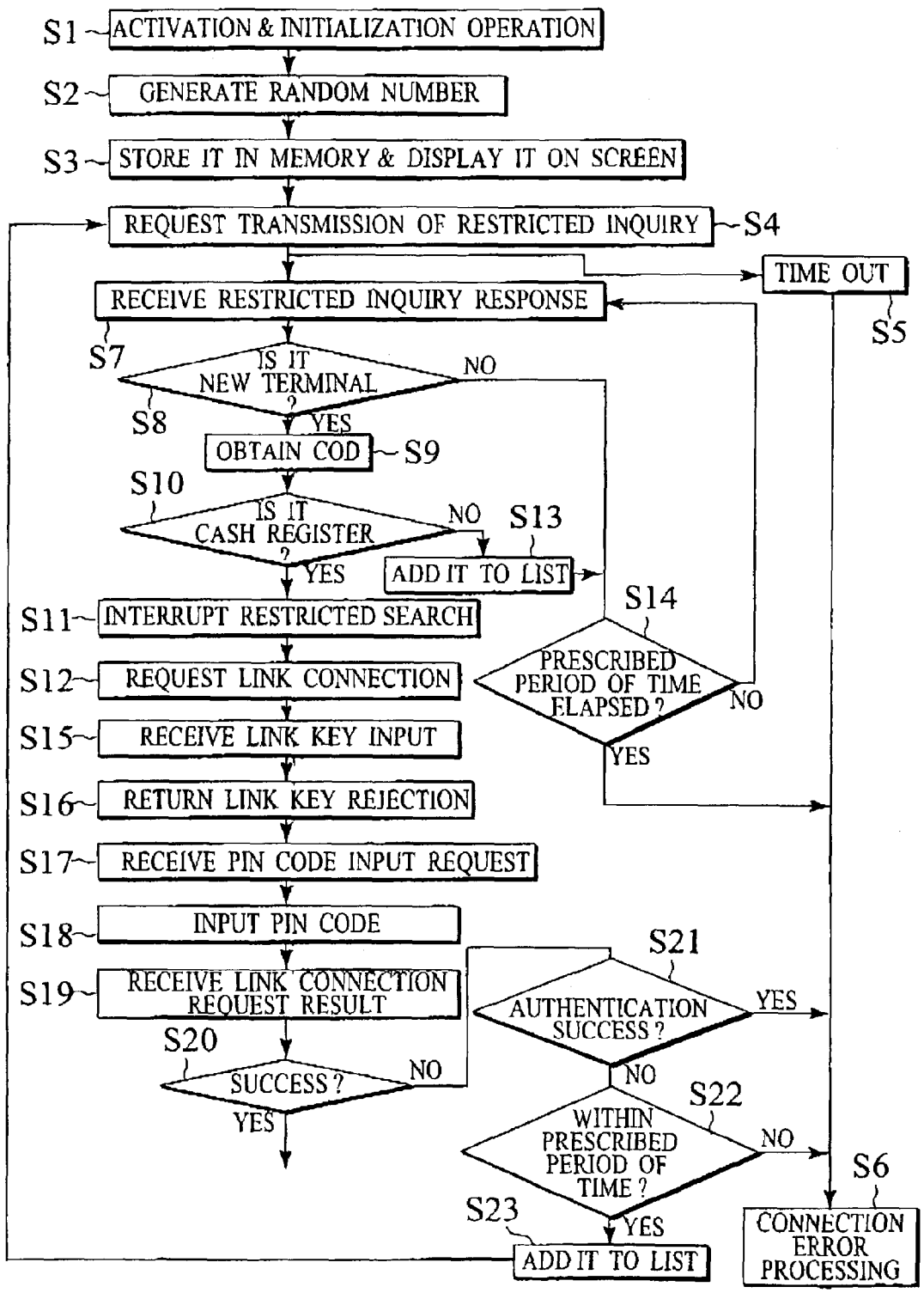
FIG. 6 is a flow chart showing an exemplary processing operation of a portable terminal according to the first embodiment of the present invention.

FIG. 6 shows an exemplary processing operation of the portable terminal 1 in the first embodiment. FIG. 6 shows the processing operation regarding a connection of the portable terminal 1 when the customer who has the portable terminal 1 makes the payment at the cash register 2.

The customer takes out the portable terminal 1 and activates a prescribed application. This application initializes the BT transceiver unit 25 (step S1).

The application internally generates a random number (step S2), and stores this random number into the memory 13 as a tentative PIN code to be used for the authentication, while presenting this PIN code on the display unit 22 (step S3).

Also, in order to search the cash register 2 with the BT transceiver unit 39 that can carry out communications, the transmission of a restricted inquiry command is requested to the BT transceiver unit 25 (step S4). Upon receiving this request, the BT transceiver unit 25 transmits the restricted inquiry command for a prescribed period of time. At this point, the time for searching the cash register 2 that can carry out communications can be shortened by using a dedicated inquiry access code.

If there is no response from the cash register 2 even after a prescribed period of time has elapsed since the to restricted inquiry command is transmitted, it is judged as time out (step S5) and the connection error processing is carried out (step S6).

In the case where the device that can carry out communications exists in a vicinity, the BT transceiver unit 25 receives the restricted inquiry response from the cash register 2 (step S7).

Upon receiving the restricted inquiry response, the BT transceiver unit 25 of the portable terminal 1 notifies a device discovery event to the application. The application detects an identifier of the discovered device, and judges whether it is a new device or not (step S8). Here, whether the discovered device is registered in a connection rejection list or not is judged.

If it is a new device, that is if it is not registered in the connection rejection list, a Class of Device (COD) is detected (step S9), and whether the discovered device is the cash register 2 or not is judged (step S10). More specifically, if the detected COD has a value indicating the cache register 2, the interruption of the restricted inquiry is requested to the BT transceiver unit 25 (step S11), and a link connection request is made to this cash register 2 (step S12). The BT transceiver unit 25 transmits a link connection request signal to this cash register 2.

If the detected COD has a value that does not indicate the cash register 2, the identifier of the discovered device is registered into the connection rejection list (step S13). For the device registered in the connection rejection list, the connection will be rejected subsequently.

There is also a method in which the check of the new device and the check of the COD as described above are carried out by the Bluetooth by setting parameters, and the device discovery event is notified only when the corresponding device is discovered.

Note that if it cannot be discovered within a prescribed period of time (step S14), it is notified as a connection error to the customer (step S6).

After the step S12 for the link connection request described above, when a link key input event is received (step S15), a link key rejection is returned (step S16). After that, when a PIN code input event is received from the cash register 2 (step S17), the PIN code stored in the memory 13 is read out (step S18). The BT transceiver unit transmits the read out PIN code ass a control packet LMP_accepted to the cash register 2.

By this processing, the initialization key is generated at both the portable terminal 1 and the cash register 2.

Next, a link key negotiation is carried out to make an agreement that a unit key of the BT transceiver 25 of the portable terminal 1 which is the master will be used for the authentication, a procedure for making a link connection with the cash register 2 is carried out, and a link connection result signal is received from the cash register 2 to which the link connection request was made (step S19). Then, by checking the status, whether the link connection succeeded or not is judged (step S20).

When the link connection succeeded, thereafter a connection of the protocol necessary for receiving the service such as an SDP connection is made and the data for the service are transmitted and received.

When the link connection did not succeed, whether the authentication with the cash register 2 succeeded or not is judged (step S21), and if the authentication did not succeed, the connection error processing is carried out (step S6), whereas if the authentication succeeded, whether it is within a prescribed period of time or not is judged (step S22). If it is not within the prescribed period of time, the connection error processing is carried out (step S6), whereas if it is within the prescribed period of time, this device is registered into the connection rejection list (step S23).

Figure 7:
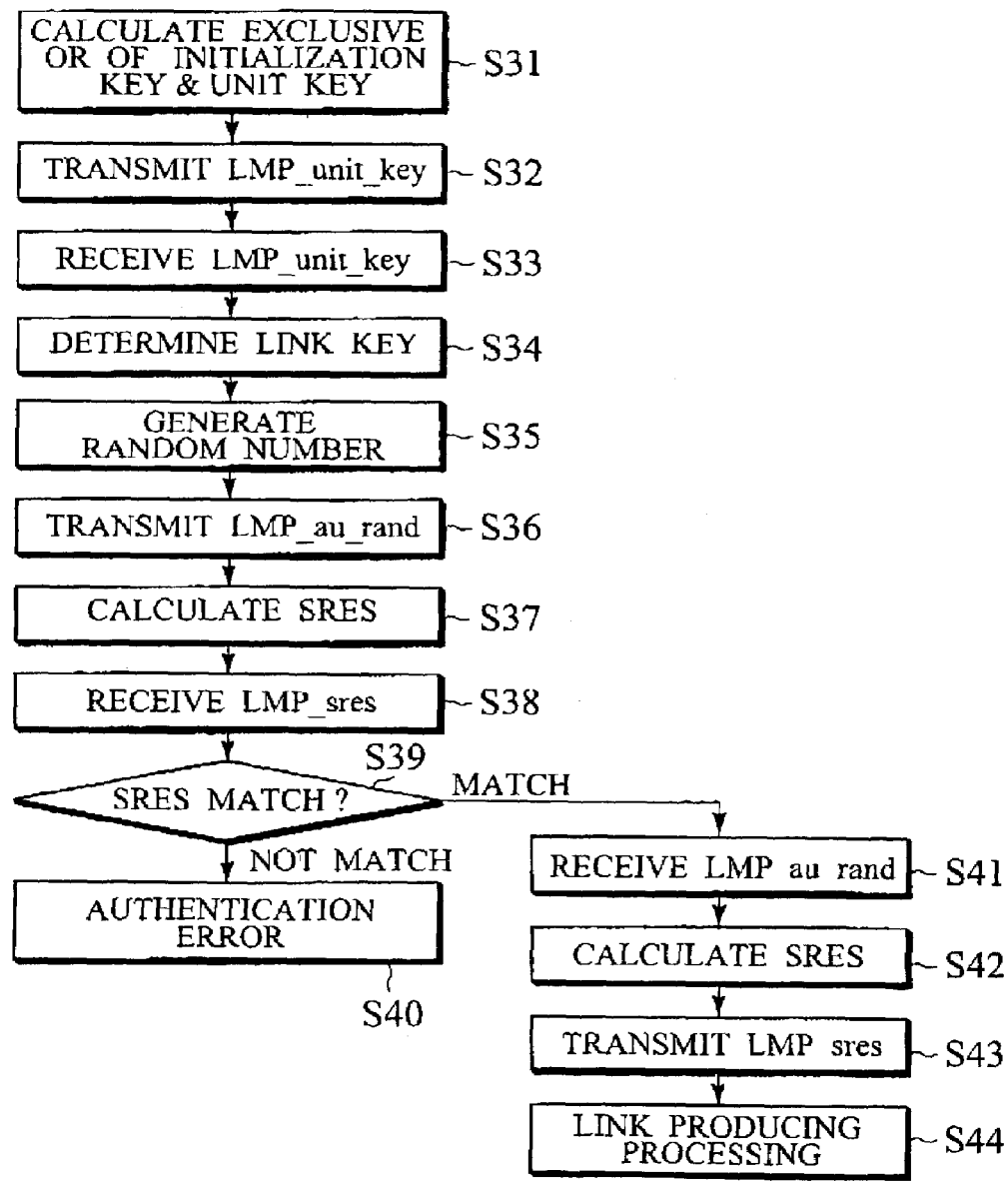
FIG. 7 is a flow chart showing a detailed processing of the steps S19 and S20 in the flow chart of FIG. 6.

FIG. 7 shows details of the processing of the steps S19 and S20 of FIG. 6. The key to be used for the authentication can be a unit key or a composite key, but usually, the unit key is used because of the limitation on the link management memory and the simplicity of the processing procedure. The composite key has a superior security performance compared with the unit key, although it requires a larger memory and a more complicated procedure.

In the negotiation, each one of the both sides transmit a request command LMP_unit_key in the case of using the unit key, or a request command LMP_comp_key in the case of the composite key, and which key is to be used is determined according to the combination of four types of requests. In the case where both transmitted LMP_unit_key, the unit key of the master will be used. In the case where one side transmitted LMP_unit_key while the other side transmitted LMP_comp_key, the unit key of the terminal that transmitted LMP_unit_key will be used. In the case where both sides transmitted LMP_comp_key, the composite key is produced by using the keys on both sides.

The unit key is a key that is permanently used once it is produced, regardless of the terminal to be connected. The database only records the Bluetooth address of the correspondent terminal for which the pairing is made so that the memory efficiency is good. For the production of the unit key, a unit key algorithm called E21 is used by using the internally generated random number and the Bluetooth address of the own terminal.

When the link key negotiation (which is assumed to be a unit key) is finished, the portable terminal 1 that has the unit key to be used calculates an exclusive OR of the unit Key of the own terminal and the initialization key generated as described above (step S31), and transmits the unit key to the cash register 2 by LMP_unit_key (steps S32 and S33). The cash register 2 that received this unit key becomes capable of safely acquiring the unit key of the portable terminal 1 by calculating the exclusive OR by using the earlier generated initialization key.

When the procedure described above is finished, the mutual authentication using the unit key is carried out by each one of the portable terminal 1 and the cash register 2. One of the portable terminal 1 and the cash register 2 (which is referred to as a device A hereafter, which can be either the master or the slave) generates a random number in 128 bits (step S35), and transmits it to the correspondent device B by using LMP_au_rand (step S38).

A value defined as Signal Result (SRES) is calculated using an algorithm called E1, by using the random number exchanged between the devices A and B, the unit link key described above, and the Bluetooth address of the device B (step S37).

The device B transmits the calculation result to the device A by using LMP_sres (step S38). Then, the device A compares received SRES and the SRES calculated by the device A itself (step S39), and it is judged as an authentication error if they are not identical (step S40), or it is judged as connection possible if they are identical. By carrying out the similar processing as the steps S36 to S38 by interchanging the roles of the devices A and B, the correspondent is authenticated mutually, to judge whether it is possible to make the connection or not (steps S41 to S44).

By the procedure of FIG. 7, it becomes possible to mutually carry out the authentication of the correspondent between the the portable terminal 1 and the cash register 2 that are connected for the first time. The above described procedure is automatically executed by the firmware so that usually the application is not involved in that processing procedure and it suffices to carry out the inputs of data with respect to the link key request and, the PIN code request.

Figure 8:
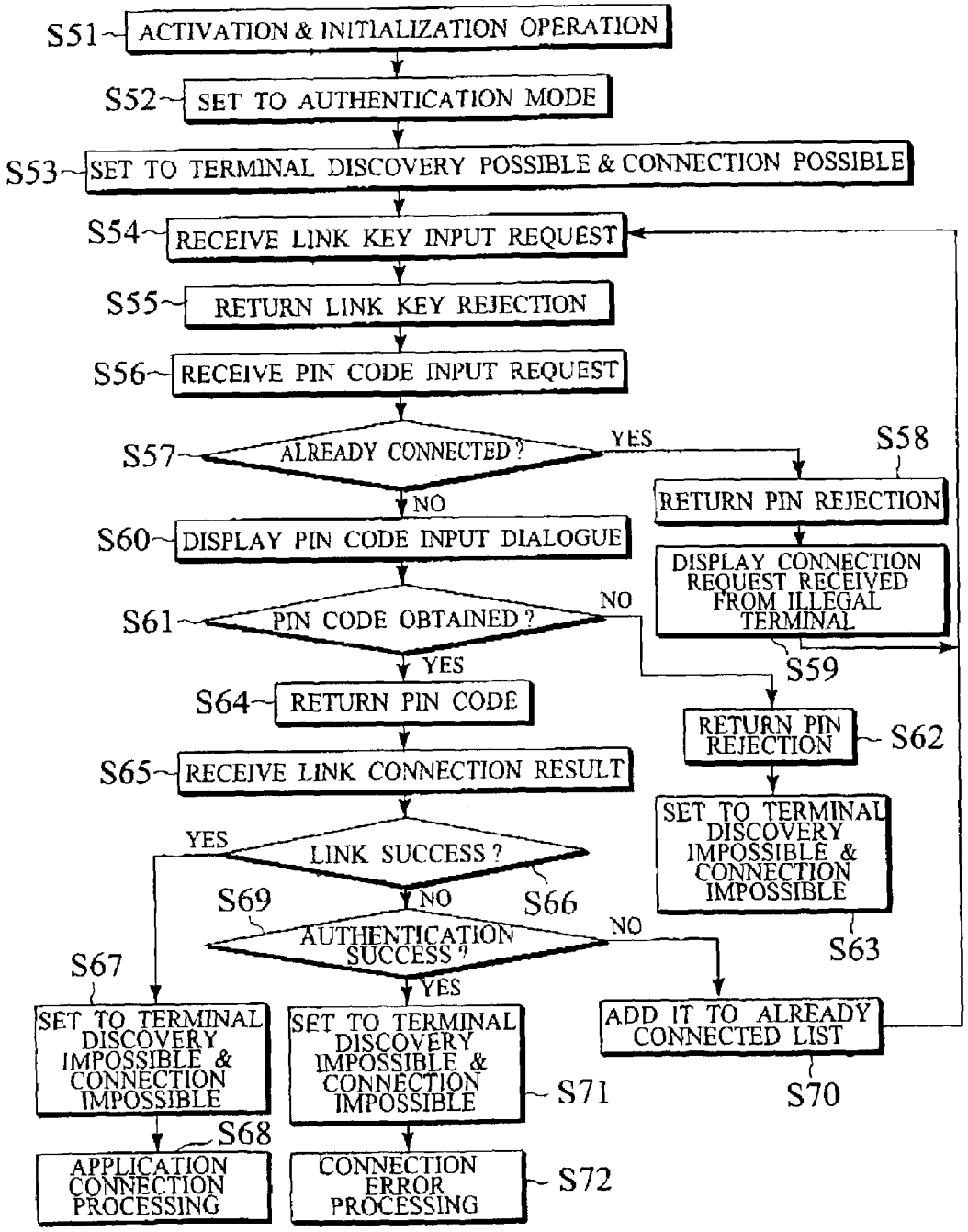
FIG. 8 is a flow chart showing an exemplary processing operation of a cash register according to the first embodiment of the present invention.

Next, an exemplary processing procedure of the cash register 2 in the first embodiment will be described with reference to FIG. 8.

First, the application is activated and the BT transceiver unit 39 is initialized (step S51), and it is set to the authentication mode (step S52).

When the BT transceiver unit 39 of the cash register 2 discovers the portable terminal 1 and becomes possible to make the connection for the sake of the customer who has the portable terminal 1 (step S53). It is notified to the BT transceiver unit 39 through the application. It is also possible to carry out the processing of the step S52 described above thereafter.

Upon receiving the restrictive inquiry message (step S54), the BT transceiver unit 39 returns information such as its own BT address and the COD that indicates the device type, to the portable terminal 1 that made the restricted inquiry (step 55).

Then, the connection request is received from the portable terminal 1. If the identifier of the portable terminal 1 that made the connection request is not registered in the connection rejection list, a connection permission is returned. If it is registered in the list, the connection rejection is returned, and the connection request from the illegal terminal is received is displayed on a display device of the cash register 2 (step S59).

After the connection permission is returned, the link key input event is received, and a negative response to it is made. Then, a PIN code input request is received (step S56) and a dialogue box to enter a tentative PIN code input is presented to the operator to urge the operator to enter the temporary PIN code (step S60).

The operator enters the tentative PIN code displayed on the display unit of the portable terminal 1 of the customer who makes the payment at the key input unit 34. Else, the same effect can be obtained by displaying a dialogue box to urge the input of the tentative PIN code in advance of receiving the link connection request, storing the entered tentative PIN code in a memory, and using the stored data in the case of receiving a message. Else, the same effect can be obtained by enabling the customer to enter the PIN code by the key input unit accessible to the customer. Else, a bar code is displayed at the display unit 22 of the portable terminal 1, which is read by a scanner or imaged by a CCD camera, subjected to the character recognition, and set as the tentative PIN code. Else, the same effect can be obtained by acquiring the tentative PIN code through IrDA It is also possible to use a method which does not use a random number as the tentative PIN code, in which the user stores a number as a secret code in the memory 13 of the portable terminal 1 in advance, and uses that number stored in the memory 13 when an event indicating the PIN code input is received. In this case, there is a possibility that the strength of the security becomes inferior to the case of using a random number because the fixed PIN code is used, but the processing at the portable terminal 1 can be simplified as there is no need to present the tentative PIN code at the display unit. Else the same effect as in the case of using a random number can be obtained by using a part or whole of the data obtained from the clock within the own device.

Next, whether the PIN code is acquired or not is judged (step S61), and if it cannot be acquired, the PIN code rejection is returned (step S62), and it is set to be a state which is impossible to make a connection because a terminal cannot be discovered (step S63).

On the other hand, when the PIN code is acquired, the acquired PIN code is transmitted to the BT transceiver unit 39, and the BT transceiver unit 39 transmits LMP_unit_key that contains the tentative PIN code to the portable terminal 1 (step S64).

After that, the link connection result is received from the portable terminal 1 (step S65). Then, whether the link connection processing succeeded or not is judged (step S66), and if it succeeded, it is set in a state of the connection impossible as it is impossible to discover a terminal (step S67), and then the processing for a connection to the upper protocol and a connection to an application is carried out (step S68).

In the case where the link connection processing did not succeed at the step S66, whether the authentication with the portable terminal 1 has succeeded or not is judged (step S69), and if it did not succeed, it is registered into the connection rejection list (step S70), whereas if it it succeeded, it is set to be a state which is impossible to connect as a terminal cannot be discovered (step S71), and the connection error processing is carried out (step S72).

In the ease where the connection request is made to the BT transceiver unit 39 of the cash register 2 different from the cash register 2 at which the payment is to be made by the portable terminal 1, the operator of the incorrect cash register 2 commands a cancellation, or the authentication of the terminal fails as the incorrect tentative PIN code is entered. In this case, the BT transceiver unit 25 of the portable terminal 1 notifies a link connection request failure message to the application, and the application notifies the failure to the user. Then, either the user commands the connection request again or the application automatically makes the connection request.

In the case of automatically making the connection request, whether the number of times for the terminal discovery is within a prescribed number or not is judged, and if it is within the prescribed number, the Bluetooth address corresponding to the device (the portable terminal 1 or the cash register 2) that failed the authentication is added to the connection rejection list, and the request for transmitting the restricted inquiry to the BT transceiver unit 25 is made. Thereafter, by checking the list at a time of the terminal discovery, it is possible to avoid making a connection to a terminal that had failed the authentication once.

Next, the case of assuming a situation where there exists a device that pretends the cash register 2 in a vicinity of the cash register 2 will be described. The pretending device uses the same remote name and the COD as the cash register 2 so that the BT transceiver 25 of the portable terminal 1 handles the pretending device as the cash register 2 as a result of checking the COD.

The tentative PIN code generated by the portable terminal 1 of the user is presented only to the operator of the cash register 2 so that the malicious pretending device cannot acquire the displayed tentative PIN code information and the correct authentication procedure is not carried out so that the link connection request fals. The application of the portable terminal 1 checks the status of the link connection request result, and if its reason is in a state indicating that the authentication of the correspondent has failed, the Bluetooth address of the correspondent that made the link connection request is recorded into a non-corresponding list.

Thereafter, the restricted inquiry is carried out again similarly as in the above, and if the Bluetooth transceiver 25 of the portable terminal 1 receives a response to the restricted inquiry, the terminal discovery event is notified to the application. The application checks the Bluetooth address of the discovered terminal and ignores the discovered terminal if it is a terminal recorded in the non-corresponding list.

By the above described method, the connection request will not be made to the terminal that had failed the authentication once, so that it is possible to automatically eliminate the device that pretends the cash register 2, and it becomes possible to easily realize the connection with the desired terminal.

Next, the processing of the cash register 2 in the case where the connection request is received from the device other than the portable terminal 1 owned by the user who makes the payment will be described.

In this case, the tentative PIN code entered into the cash register 2 and the tentative PIN code entered at the portable terminal 1 which made the connection request are different so that the authentication of this terminal falls, and the connection request result is a failure. The application of the cash register 2 checks the status of the link connection request result, and if its reason is in a state indicating that the authentication of the correspondent has failed, the Bluetooth address of the correspondent that made the link connection request is recorded into an already connected list.

When the connection request is received from the portable terminal 1 again, the connection request also contains the Bluetooth address of the requestor, so that whether this address is contained in the already connected list or not is checked. If it is contained, the rejection to the connection request is returned, and that the connection request from the illegal terminal has been received is displayed on the display unit 40 of the cash register 2.

In this embodiment, the cash register 2 is set to be in a mode that requires the authentication, but it is also possible to set the portable terminal 1 to be in a mode for carrying out the authentication. The same effect can also be obtained by setting both of them in a mode that requires the authentication.

As described, according to the first embodiment, the PIN code is generated at the portable terminal 1 possessed by the customer who makes the payment at the cash register 2, and the generated PIN code is presented to the operator of the cash register 2. Then, after the operator enters the PIN code into the cash register 2, the authentication processing is carried out at both tile portable terminal 1 and the cash register 2 by utilizing this PIN code, so that there is no possibility for having the PIN code acquired illegally, and it is possible to improve the security performance.

Second Embodiment

In contrast to the first embodiment in which the PIN code is generated at the portable terminal 1, the second embodiment is directed to the case of generating the PIN code at the cash register 2.

Figure 9:
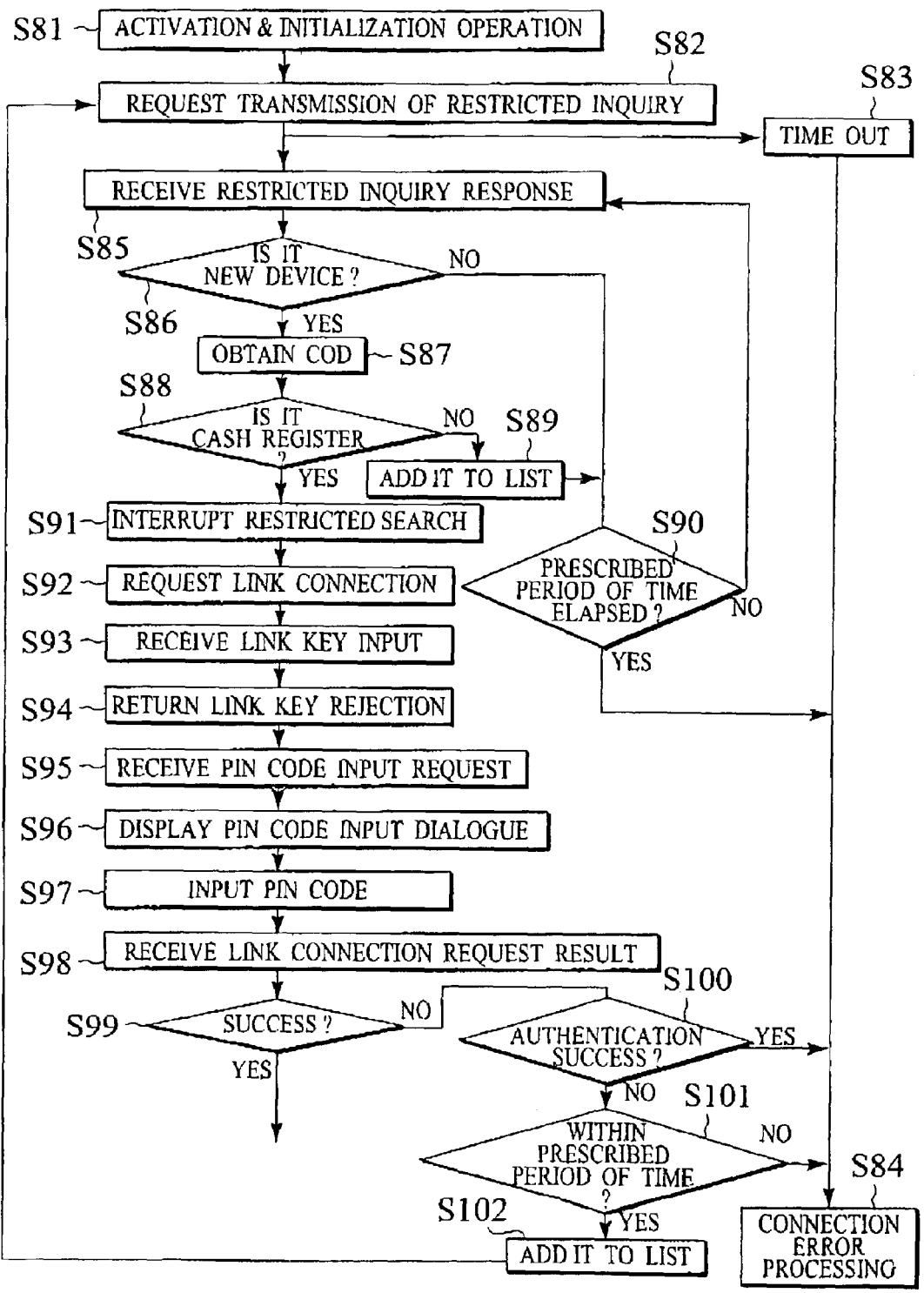
FIG. 9 is a flow chart showing an exemplary processing operation of a portable terminal according to the second embodiment of the present invention.
Figure 10:
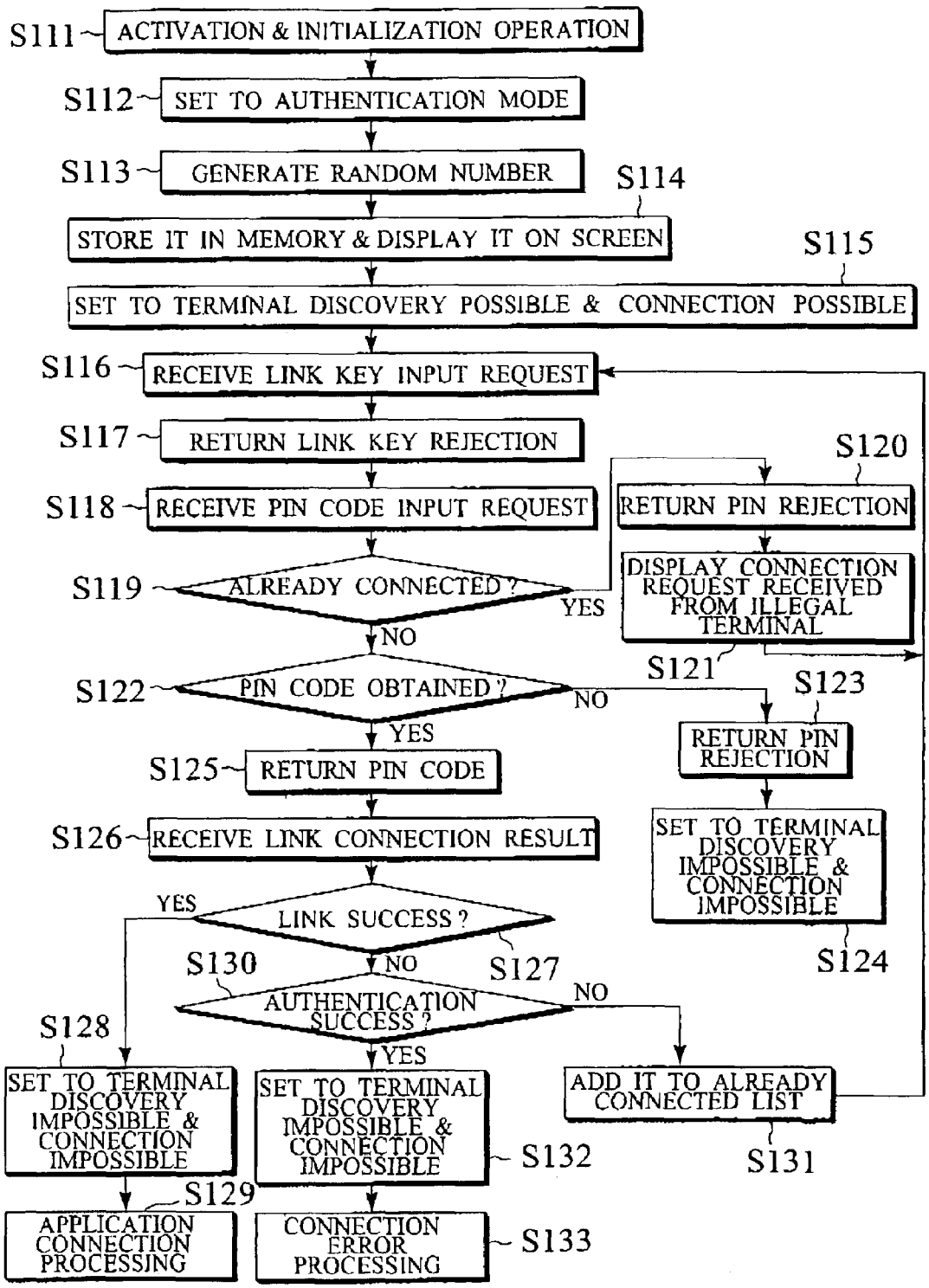
FIG. 10 is a flow chart showing an exemplary processing operation of a cash register according to the second embodiment of the present invention.

FIG. 9 shows an exemplary processing operation of the portable terminal 1 in the second embodiment, and FIG. 10 shows an exemplary processing operation of the cash register 2 in the second embodiment. The flow charts of FIG. 9 and FIG. 10 contain many overlaps with the flow charts of FIG. 6 and FIG. 7, so that the differences will be mainly described in the following.

The user who makes the payment at the cash register 2 takes out the portable terminal 1 and activates an application for receiving services. This application initializes the BT transceiver unit 25 (step S81).

Then, in order to search the cash register 2 with the BT transceiver unit 39 that can be connected to the BT transceiver unit 25, the issuance of a restricted inquiry command is requested to the BT transceiver unit 25, and the BT transceiver unit 25 transmits the restricted inquiry command (step S82).

The operator of the cash register 2 notifies the BT transceiver unit 39 through the application when the BT transceiver unit 39 of the cash register 2 becomes capable of making the terminal discovery and the connection, for the sake of the customer who has the portable terminal 1 (step S115). In addition, the BT transceiver unit 39 is set to a mode that requires the link level authentication and a mode that enables the pairing (step S112) (this operation may be carried out by the initialization routine of the application).

At this point, the application of the cash register 2 internally generates a random number (step S113), stores it into a memory as a tentative PIN code to be used for the authentication, and presents that number to the display device of the cash register 2 (step S114).

When the restricted inquiry message is received, the BT transceiver unit 39 of the cash register 2 returns information such as its own Bluetooth address and a COD indicating the device type, to the terminal which made the restricted inquiry.

Upon receiving the restricted inquiry response, the BT transceiver unit 25 of the portable terminal 1 notifies a device discovery event to the application. The application checks an identifier of the discovered device (step S86), and if it is a newly discovered device, the application checks the COD (step S87). It the COD has a value indicating the cash register 2, the interruption of the restricted inquiry is requested to the BT transceiver unit (step S91), and a request for a link connection with the discovered device is made to the BT transceiver unit 25 (step S92). The BT transceiver unit 25 transmits a connection request to the discovered device.

If the COD is different, the identifier of the discovered device is registered into the connection rejection list (step S89). There is also a method in which the check of the view device and the check of the COD are carried out by the Bluetooth transceiver unit 25 by setting parameters, and the device discovery event is notified only when the corresponding device is discovered. Note that if it cannot be discovered within a prescribed period of time, it is notified as a connection error to the customer.

The BT transceiver unit 39 of the cash register 2 notifies the link key input event to the application, as the link connection request requires the security at the link level (step S116). As it is the portable terminal 1 that is connected for the first time, "negative" is inputted into the BT transceiver unit 39 in response to the link key input request (step S117). The BT transceiver unit 39 notifies an event indicating the input of the PIN code to the application. In the case where this message is received (step S118), the application inputs the tentative PIN code recorded in the memory 32 to the BT transceiver unit 39, and the BT transceiver unit 39 transmits LMP_unit_key to the portable terminal 1 (step S125).

On the other hand, when the link key input is received (step S93), the portable terminal 1 returns the link key input rejection (step S94). After that, when a PIN code input request is received (step S95), the BT transceiver unit 25 of the portable terminal 1 notifies an event indicating the PIN code input to the application, and the application presents a dialogue box for carrying out the tentative PIN code input to the operator (step S96), to urge the input of the tentative PIN code. The owner of the portable terminal 1 carries out the input of the tentative PIN code shown at the display unit of the cash register 2 (step S97). Else, the same effect can be obtained by displaying the dialogue box for urging the input of the tentative PIN code in advance, before transmitting the link connection request, recording the inputted tentative PIN code data into the memory, and using the recorded data when the message is received. The BT transceiver unit 25 of the portable terminal 1 transmits LMP_accepted to the BT transceiver 39 of the cash register 2. By this processing, the initialization key is generated at both sides.

As described, in the second embodiment, when the customer makes the payment at the cash register 2, the PIN code generated by the cash register 2 is inputted into the portable terminal 1 and the authentication processing is carried out at both the portable terminal 1 and the cash register 2 by utilizing this PIN code, so that the security performance can be improved without complicating the authentication procedure.

Third Embodiment

In contrast to the first and second embodiments in which the link authentication function of the Bluetooth is utilized, the third embodiment is directed to the case of not utilizing the link authentication function.

Figure 11:
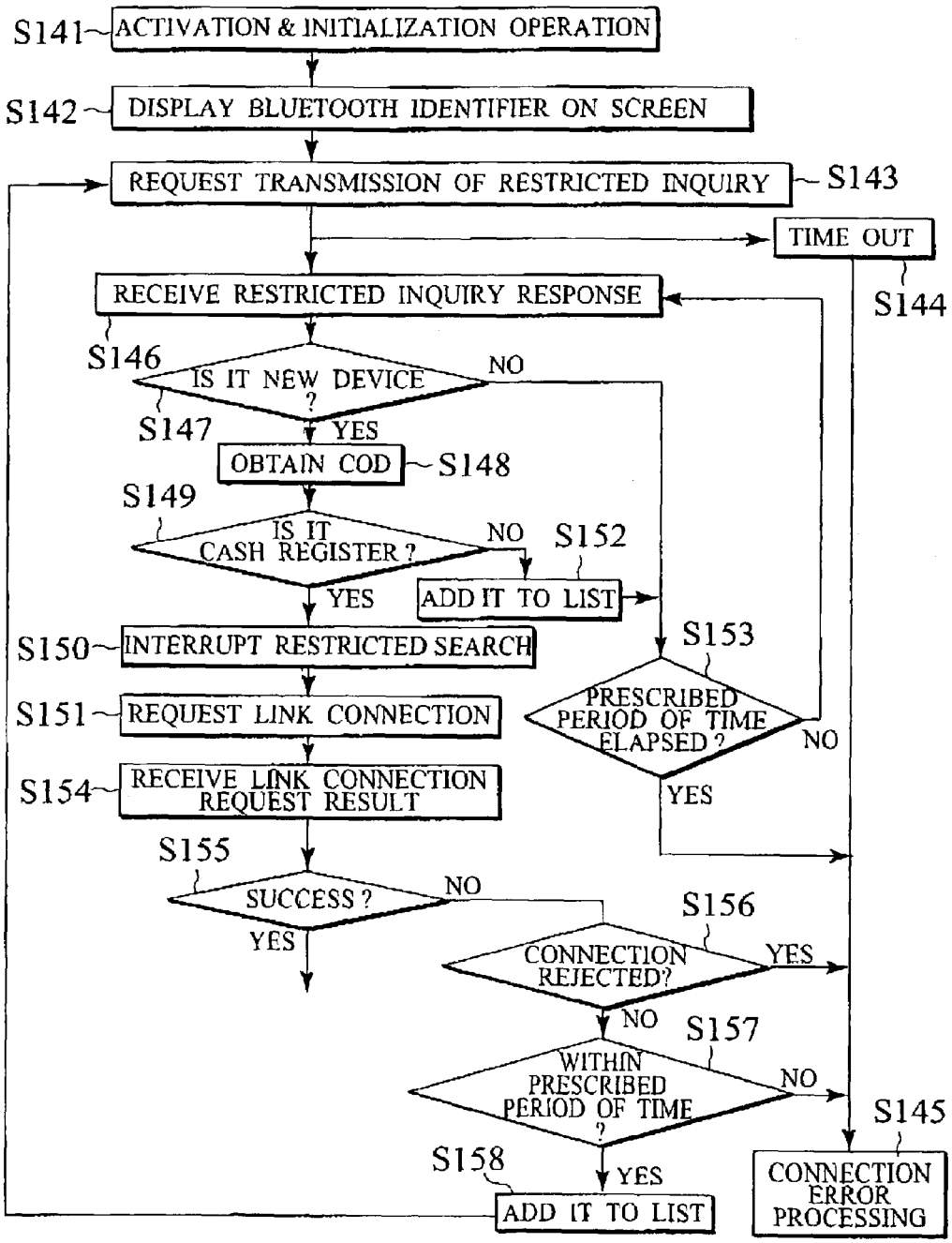
FIG. 11 is a flow chart showing an exemplary processing operation of a portable terminal according to the third embodiment of the present invention.

FIG. 11 shows an exemplary processing operation of the portable terminal 1 in the third embodiment.

The user who makes the payment at the cash register 2 takes out the portable terminal 1 and activates an application for receiving services. This application initializes the BT transceiver unit 25 (step S141).

The application presents a part or a whole of the identifier of the portable terminal 1 at the display unit 22 (step S142). At the same time, in order to search the cash register 2 with the BT transceiver unit 39 that is connectable, the issuance of a restricted inquiry command is requested to the BT transceiver unit 25, and the BT transceiver unit 25 transmits the restricted inquiry command for a prescribed period of time (step S143). At this point, the time for searching the cash register 2 that is the correspondent can be shortened by using a dedicated inquiry access code.

If the cash register 2 cannot be found after the search for a prescribed period of time (step S144), the connection error processing is carried out (step S145).

When the response to the restricted inquiry is received from the cash register 2 (step S146), the terminal discovery event is notified to the application.

The application cheeks an identifier of the discovered device (step S147), and if it is a newly discovered device, the COD is acquired (step S148). If the COD has a value indicating the cash register 2, the interruption of the transmission of the restricted inquiry is requested to the BT transceiver unit 25 (steps S149, S150), and a request for a link connection with this cash register 2 is made to the BT transceiver unit 25 (step S151). The BT transceiver unit 25 transmits a connection request to the cash register 2.

If the COD is different, the identifier of the discovered device is registered into the connection rejection list (step S152). There is also a method in which the check of the new device and the check of the COD are carried out by the Bluetooth transceiver unit 25 by setting parameters, and the device discovery event is notified only when the corresponding device is discovered. Note that if it cannot be discovered within a prescribed period of time (step S153), it is notified as a connection error to the customer (step S145).

After the step S109 described above, the link connection request result is received from the cash register (step S154), and if the connection succeeded (step S155), the connection to the upper level protocol and the connection processing by the application are carried out.

On the other hand, if the connection failed, whether it is within a prescribed period of time or not is judged. The connection error processing of the step S145 is carried out when the prescribed period of time is exceeded, or it is added to the connection rejection list if it is within the prescribed period of time (step S158).

Figure 12:
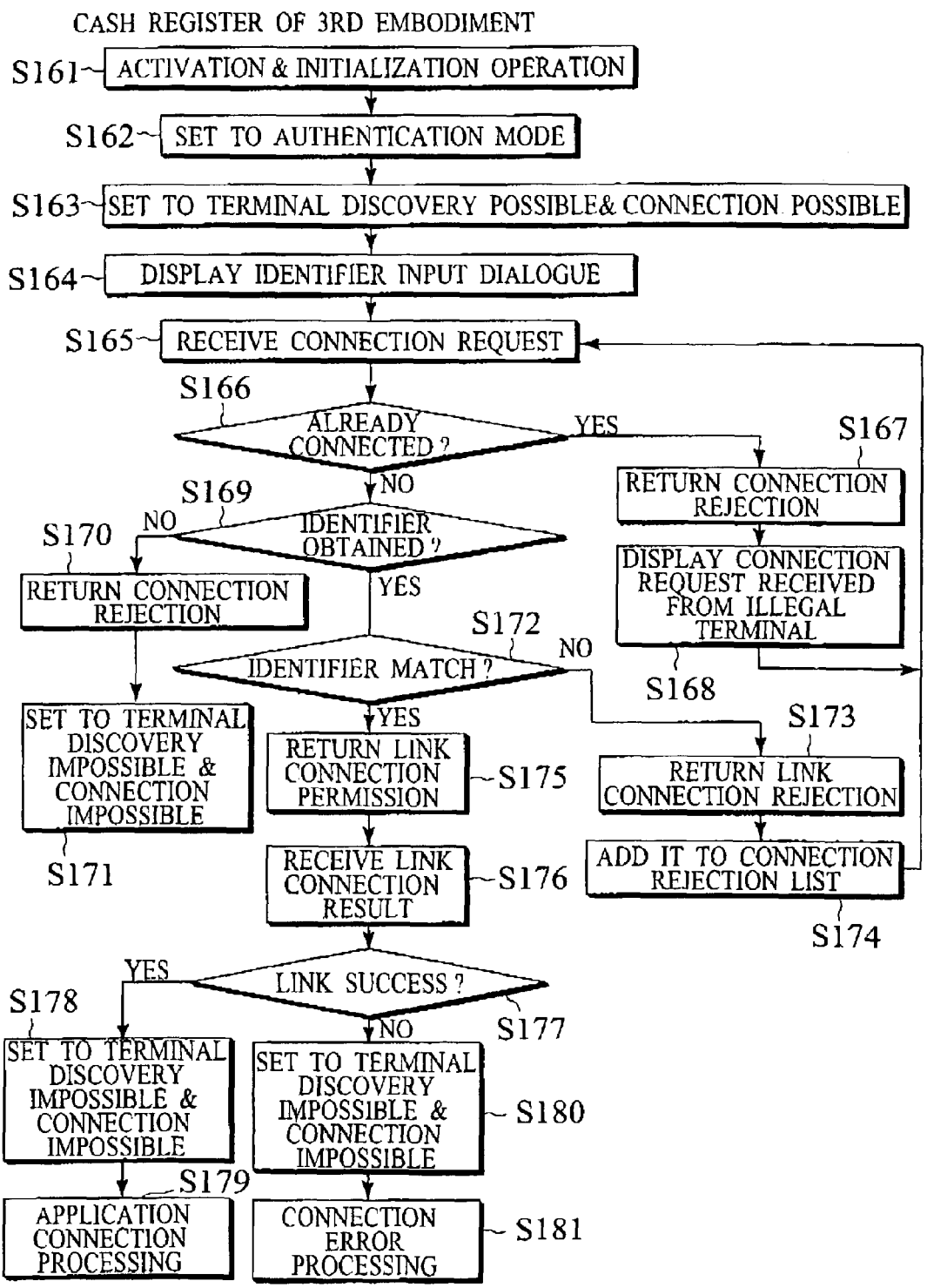
FIG. 12 is a flow chart showing an exemplary processing operation of a cash register according to the third embodiment of the present invention.

FIG. 12 shows an exemplary processing operation of the cash register 2 in the third embodiment.

The operator of the cash register 2 commands the BT transceiver unit 39 to set the BT transceiver unit 39 in a state in which the terminal discovery is possible and the connection is possible, through the application (steps S161 to S163).

A dialogue box for making an identifier input is presented to the operator, to urge the input of the identifier (step S164). The operator inputs the identifier shown at the display unit 22 of the portable terminal 1 of the customer who makes the payment, from the key input unit 23. Else, the same effect can be obtained by displaying the dialogue box for urging the input of the identifier in advance, before receiving the link connection request, recording the inputted identifier into the memory 13, and using the recorded data when the message is received. Else, the same effect can be obtained by giving the key input unit 23 to the customer, such that the customer carries out the input of the identifier. Else, the same effect can be obtained by displaying a bar code at the display unit 22 of the portable terminal 1, reading it by a scanner or taking an image of it by a CCD camera, and using it as an identifier by carrying out a character recognition, or acquiring an identifier through IrDA.

Then, when the BT transceiver unit 39 of the cash register 2 receives the restricted inquiry message, the information such as the own Bluetooth address and the COD indicating the device type is returned to the terminal that made the restricted inquiry.

Then, when the connection request is received (step S165), whether the portable terminal 1 that made the connection request is registered in the connection rejection list or not is judged (step S166), and if it is registered, the connection rejection response is made to the portable terminal 1 (step S167), the notification that the connection request from the illegal terminal is received is displayed (step S168), and the processing returns to the step S165.

At the step S166 described above, if it is judged that the portable terminal 1 that made the connection request is not registered in the connection rejection list, whether the identifier of this portable terminal 1 is acquired or not is judged (step S169), and if it is not acquired, the connection rejection response is made to the portable terminal 1 (step S170), and it is set to a state in which the terminal discovery is impossible and the connection is impossible (step S171).

At the step S169 described above, if the identifier is acquired from the portable terminal 1, whether the identifier inputted at the step S164 and the acquired identifier coincide or not is judged (step S172). If they do not coincide, the connection rejection response is made 8step S173), and this portable terminal 1 is added to the connection rejection list (step S174).

At the step S172 described above, if it is judged that the identifiers coincide, the link connection permission response is made (step S175), and then the link connection result from the portable terminal 1 is received (step S176).

Whether the link connection succeeded or not is judged according to the link connection result (step S177), and if it succeeded, it is set to a state in which the terminal discovery is impossible and the connection is impossible (step S178), and the connection processing by the application is carried out (step S179).

At the step S177 described above, if it is judged that the link connection did not succeed, it is set to a state in which the terminal discovery is impossible and the connection is impossible (step S180), and the connection error processing is carried out (step S181).

As described, in the third embodiment, the identifier of the portable terminal 1 is inputted by the operator of the cash register 2, and the connection processing by the application is carried out when the inputted identifier and the identifier transmitted from the portable terminal 1 coincide, so that it becomes possible to carry out the communications between the portable terminal 1 and the cash register 2 within a time shorter than the case of using the link authentication function as in the first and second embodiments.

Fourth Embodiment

In the first to third embodiments described above, it takes an extra connection time in order to carry out the terminal search when an attempt to make a connection to an incorrect correspondent is made. Also, there is a possibility for the operator of the cash register 2 to input the PIN code incorrectly.

The fourth embodiment is directed to the case where the identification information of the portable terminal 1 is displayed in a form of the bar code or the like at the display unit 22 of the portable terminal 1, and the authentication processing is carried out by reading that identification information at the cash register 2. This embodiment presumes the case where the cash register 2 makes a connection to the portable terminal 1, that is the ease where the cash register 2 is a master and the portable terminal 1 is a slave.

Figure 13:
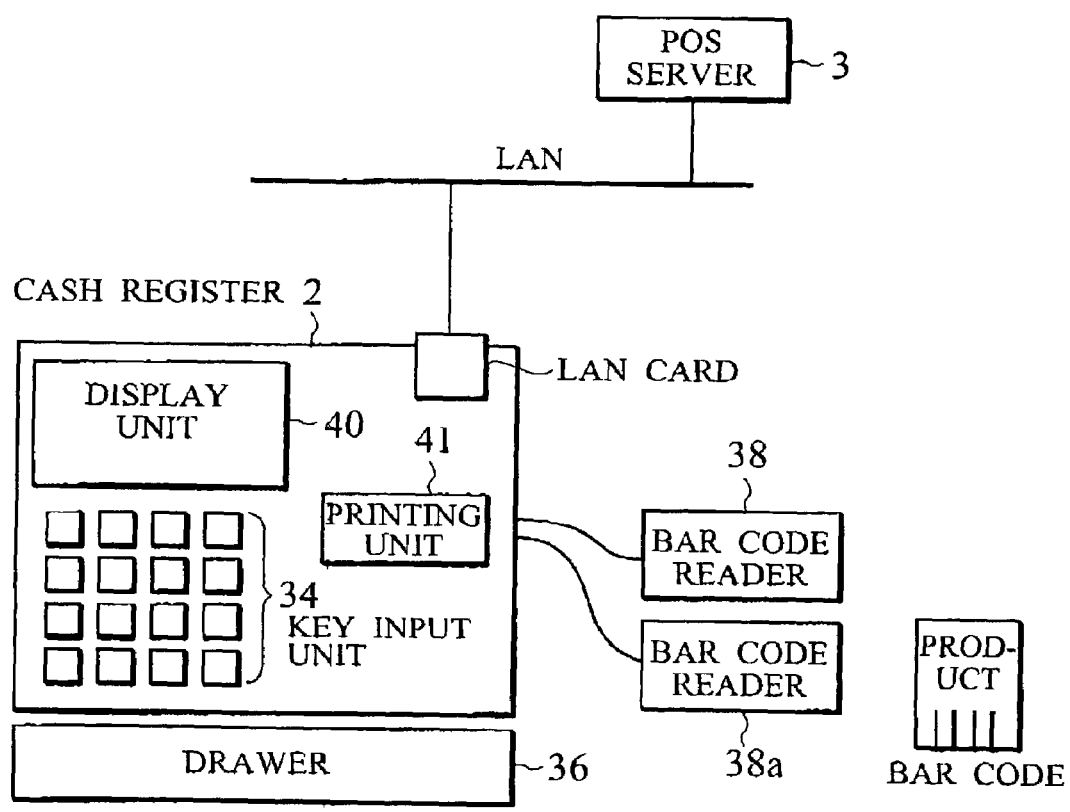
FIG. 13 is a diagram showing a schematic configuration of a cash register according to the fourth embodiment of the present invention.
Figure 14:
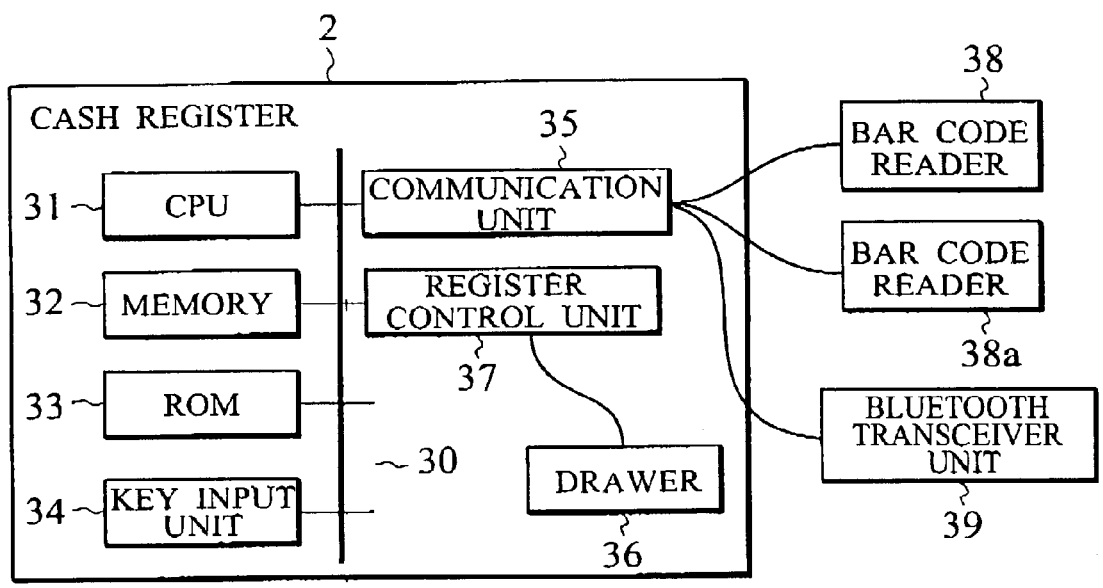
FIG. 14 is a block diagram showing an internal configuration of the cash register according to the fourth embodiment of the present invention.
Figure 15:
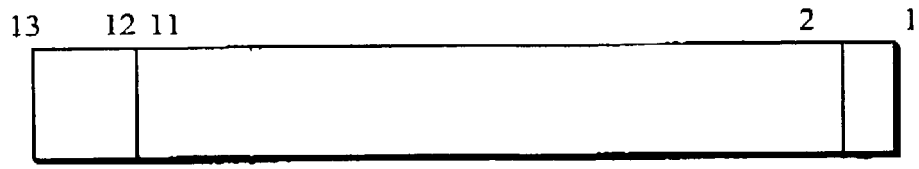
FIG. 15 is a diagram showing a content of JAN13 bar code that is used in the fourth embodiment of the present invention.

FIG. 13 shows a schematic configuration of the cash register 2 in the fourth embodiment, and FIG. 14 shows an internal configuration of the cash register 2 of FIG. 13. The cash register 2 of this embodiment has a bar code reader 38a for reading the bar code displayed at the display unit 22 of the portable terminal 1, in addition to the configuration of the cash register 2 shown in FIG. 3 and FIG. 4.

Note that it is also possible to provide only one bar code reader 38 and carries out both the product registration and the acquisition of the identification information of the portable terminal 1 by this bar code reader 38, as shown in FIG. 3. In this case, which one of the product registration and the acquisition of the identification information of the portable terminal 1 is to be carried out can be switched at the key input unit 34 of the cash register 2. Else, a dedicated button for carrying out such a switching may be provided.

In the case of providing a dedicated button, the operator of the cash register 2 acquires the identification information of the portable terminal 1 by reading the bar code displayed at the display unit 22 of the portable terminal 1 by using the bar code reader 38a, under the state where it is set to be a mode for carrying out the acquisition of the identification information of the portable terminal 1 by pressing the button.

Else, by embedding the information indicating whether it is the identification information of the portable terminal 1 or not in the bar code itself in advance, it is possible to switch the utilization purpose of the bar code reader 38a automatically without providing any button. Namely, by analyzing the content of the bar code at the cash register 2, it is possible to automatically judge whether it is a bar code indicating the identification information of the portable terminal 1 or a bar code indicating the identification information of the product.

Also, in the case of providing the dedicated bar code reader 38a for the purpose of acquiring the identification information of the portable terminal 1 as shown in FIG. 13, it can be combined with an infrared ray sensor such that the bar code reader 38a starts the reading operation automatically when a distance between the portable terminal 1 and the bar code reader 38a becomes close.

Usually the reading time of the bar code reader is several hundred milli-seconds, so that the automatic reading is carried out as described above, the terminal identification information can be conveyed to the service providing device in several hundred milli-seconds since the terminal owner places the portable terminal 1 near the bar code reader 38a, and it is possible to shorten the time of 10 or so seconds required for the terminal search phase of the Bluetooth.

Also, in this embodiment, the identification information of the portable terminal 1 to be specified as the correspondent can be conveyed to the cash register 2 as the operator of the cash register 2 simply carries out the explicit operation to place the portable terminal 1 near the bar code reader 38a, so that the time for searching the portable terminal 1 can be shortened similarly as described above.

The bar code can be given in either one of two types, including a one-dimensional bar code and a two-dimensional bar code. The two-dimensional bar code can convey more information, but the price of the bar code reader is high so that it is not as widespread as the one-dimensional bar code. The bar code reader for reading the one-dimensional bar code is widespread at the general retail stores, etc.

In view of such a background, the exemplary case of using the one-dimensional bar code will be mainly described, but it is also applicable to the two-dimensional bar code. The one-dimensional bar codes include JAN13, JAN8, CODE39, CODE128, standard ITF, and NW-7, and they can be used in different fields according to their properties.

The bar code currently generally used by the distribution industry in Japan is JAN13 code, which uses 13 digits number. Among 13 digits, 2 digits indicate a country code, 5 digits indicate a company code, 5 digits indicate a product code, and one digit indicates a check code, but it also possible to assign different numbers for different stores.

In the connection procedure of the Bluetooth, 32 bits (4294967296) out of the correspondent address, that is 10 digits data are necessary. For this reason, in the case of using JAN13, 10 digits output of 12 digits can be used for the identification information, and the remaining 2 digits can be used for expressing the other information.

Figure 16:
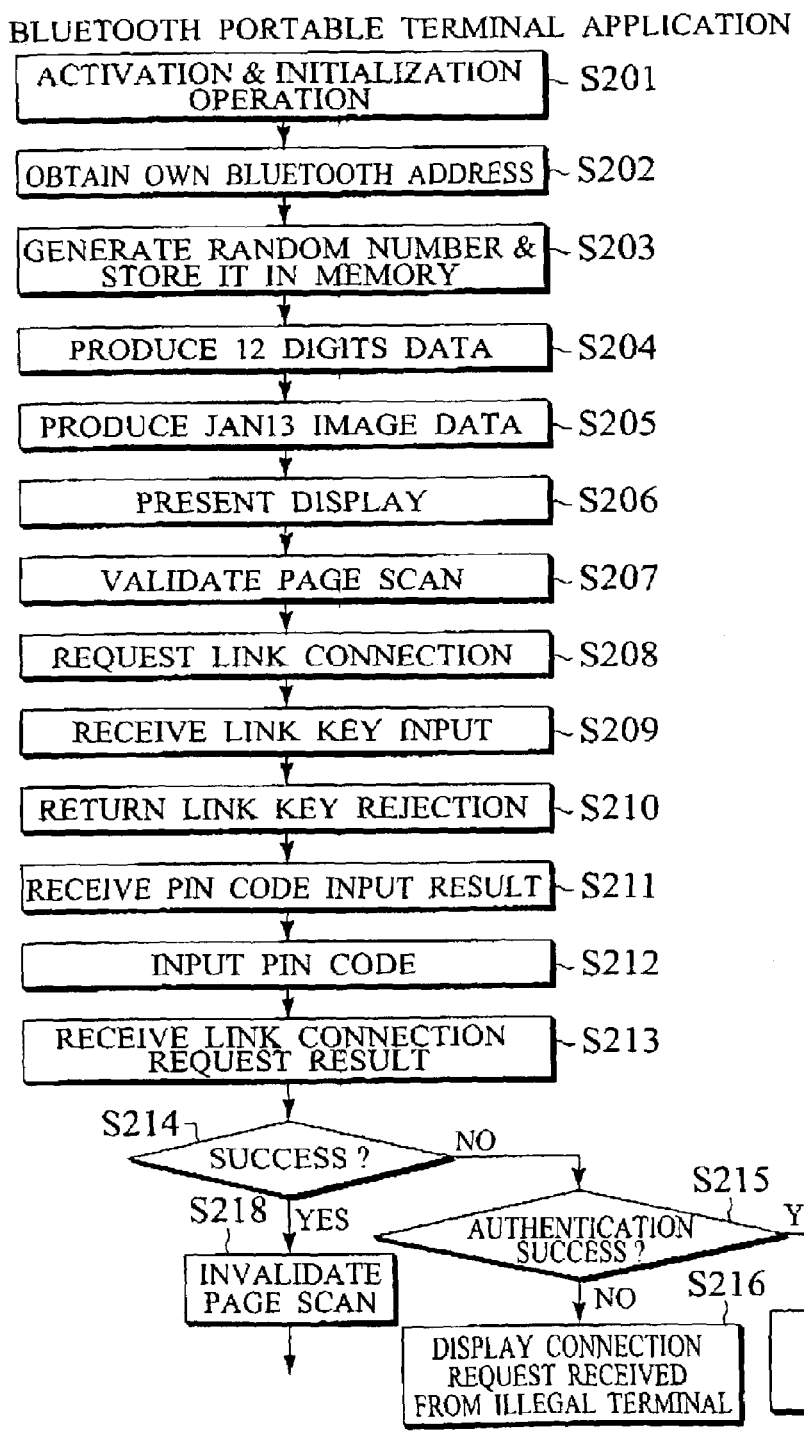
FIG. 16 is a flow chart showing an exemplary processing operation of a portable terminal according to the fourth embodiment of the present invention.
Figure 17:
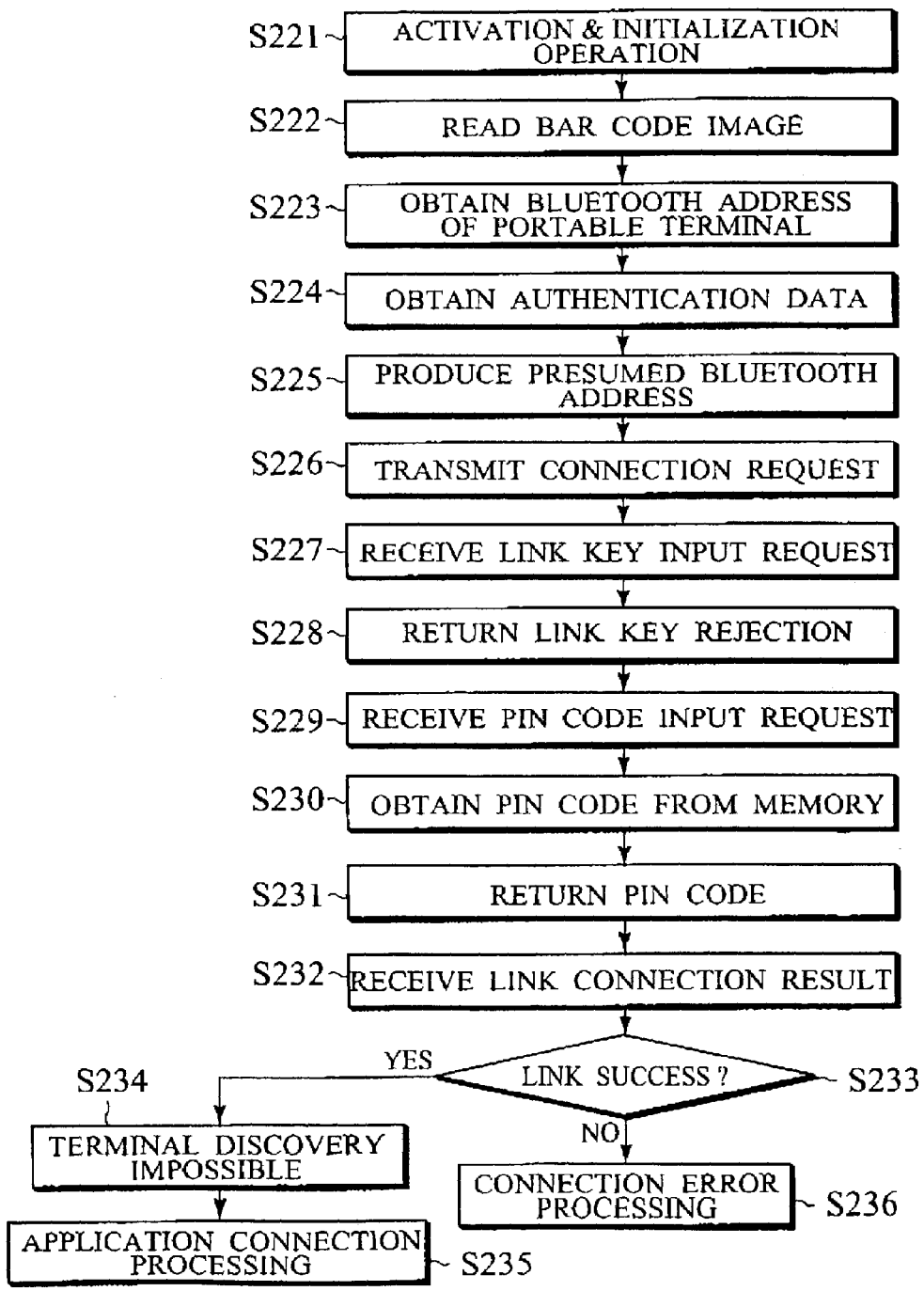
FIG. 17 is a flow chart showing an exemplary processing operation of a cash register according to the fourth embodiment of the present invention.

FIG. 16 shows an exemplary processing operation of the portable terminal 1 in the fourth embodiment, and FIG. 17 shows an exemplary processing operation of the cash register 2 in the fourth embodiment.

First, the dedicated application for receiving the service providing is activated by a command of the owner of the portable terminal 1 (step S201). Then, the 48 bits identifier which is the Bluetooth address of the own terminal is acquired by issuing HCI_READ_BD_ADDR through the HCI (step S202). Else, the Bluetooth address is acquired at a time of activating the application for the first time and that address is recorded into a non-volatile memory, such that it can be read out from the non-volatile memory from the next time on, or the terminal owner acquires the identifier assigned to the portable terminal 1 in advance by some means, and registers it to the application manually.

Next, the random number to be used for the authentication processing is generated, and the generated random number is stored into the memory 13 (step S203).

Next, only the lower 32 bits of the address read out at the step S202 are acquired, and converted into the decimal number. At this point, if the value of the identifier is so small that it cannot fill 10 digits, as many zeroes as necessary are added at a top to make it 10 digits.

In the case of not using the authentication, the arbitrary two digits number is added to the upper two digits or the lower two digits, to generate a number in 12 digits (step S204).

In the case of using the authentication, the random number generated at the step S203 is added to the 10 digits of the Bluetooth identifier as the upper two digits or the lower two digits. Else, a fixed two digits number that is snared in secret at both sides may be used.

At this point, in order to improve the security performances the encryption of the connection information can be made, by carrying out an invertible operation on the generated 12 digits such as calculation of the exclusive OR with a secret 12 digits data, or by carrying out the bit exchanges according to the predetermined rules.

Next, the image for the JAN13 code is generated by using the 12 digits number generated at the step S204 (step S205). The JAN13 image data has the determined specification, so that the number (lower one digit) for the checksum is calculated according to the specification and the bar code image in horizontal 95 dots is produced according to the obtained 13 digits number. Note that, the bar code image of N times 95 dots may be produced if the screen of the portable terminal 1 is large.

Next, the produced bar code image is presented on a display screen (step S206), and the Bluetooth device is changed to a page scan possible mode (step S207). Also, the parameters such as the scan window and the scan interval are changed to 22.5 ms and 160 ms, respectively, for example. In this way, the link level connection time can be shortened.

When the image display on the portable terminal 1 is confirmed, the terminal owner places the display unit of the portable terminal 1 close to the bar code reader 38*a* of the cash register 2, to carry out the reading of the bar code image by the bar code reader 38*a*.

Thereafter, the portable terminal 1 carries out the connection and authentication processing similarly as in FIG. 6 (steps S208 to S217), and the page scan is invalidated when the link connection is completed (step S218).

On the other hand, the cash register 2 monitors the RS-232C port, whether the bar code reader 38*a* carried out the image reading or not is checked, and when the bar code reader 38*a* succeeds in the image data reading (step S222), the 13 digits JAN13 code is acquired (step S223).

The authentication data corresponding to the 32 bits of the correspondent Bluetooth device is acquired from the acquired 13 digits number (step S224), and converted into a sexadecinal notation. Next, the upper two bytes of the converted data are supplemented by arbitrary number, to produce a presumed Bluetooth address of the portable terminal 1 (step S225). In the case where the 12 digits number sent from the portable terminal 1 contains 2 digits authentication data, the calculation for the decryption is carried out to acquire the 10 digits number that is the identification information and the two digits number for the authentication. This two digits number for the authentication is used at a time of the link connection authentication.

Next, the link connection request is transmitted to the portable terminal 1 by using the presumed address produced above (step S226), to attempt the link level connection with the portable terminal 1. The cash register. When the link level connection completion event is received (steps S227 to S232), the cash register 2 subsequently carries out the connection of L2CAP, the connection of RFCOMM, and the connection of OBEX which is the application.

In the case where the authentication data is contained in the bar code image, at a time of carrying out the link connection authentication at both of the portable terminal 1 and the cash register 2, the 128 bits link key is generated by using the secret code or the date and time shared in advance by the both sides and the acquired two digits number for authentication as seeds when the link key input event is received, and it is utilized as the link key. Else, rather than using it directly as the link key, it can be utilized as the PIN data when the link key is rejected and the PIN data input request event is received. The link level authentication of the Bluetooth is carried out inside the LMP according to the flow chart shown in FIG. 6.

By the above procedure, the data transmission and reception between the portable terminal 1 and the cash register 2 become possible. In this state, the portable terminal 1 reads out the electronic coupon stored in the memory 13 such as EEPROM, for example, under the control of the CPU 11, and transmits the electronic coupon to the cash register 2 from the BT transceiver unit.

When the acquisition of the connection information of the portable terminal 1 succeeds, the cash register 2 also carries out in parallel the register processing which is the originally intended function of the cash register 2. Namely, the bar code B1 of the product P this customer wishes to purchase is read by the bar code reader 38*a*, the price of this product P is acquired from the POS server 3, the total amount is calculated by multiplying the price by the number of products entered at the key input unit 34, the product price and the total amount are displayed at the display unit 37, and the receipt is issued. When the bar code inputs (or the key inputs) for all the products this customer wishes to purchase are finished and their total amount is obtained, the register operator wakes a prescribed key input from the key input unit 34 to command the finishing of the register processing.

When the electronic coupon is transmitted from the portable terminal 1, the cash register 2 receives it at the BT transceiver unit 39, carries out the calculation processing for the discount of that target product by using the usable coupon under the control of the CPU 3, and obtains the final total amount. In addition, the score according to the purchased amount are obtained, and this score is transmitted as the electronic points from the BT transceiver unit 39 to the portable terminal 1. Then, the customer information is transmitted to the POS server 3 as the purchase log of this customer.

When the transmission of the electronic points is finished, the BT transceiver unit 39 of the cash register 2 executes the processing for disconnecting the radio transmission path established with this portable terminal 1. Namely, the connection disconnection and the link disconnection are carried out.

From a viewpoint of the user interface, it is preferable to notify the state by the alarm sound or the screen display to either one or both of the portable terminal 1 and the cash register 2 at such occasions as when the connection information is correctly acquired from the screen of the portable terminal 1, when the Bluetooth connection is completed, and when the service providing processing is finished (when the link is disconnected). In the case of using the portable telephone, it is also possible to vibrate the portable telephone or turn on its illumination.

As described in the fourth embodiment, the bar code image indicating the identification information of the portable terminal 1 and the authentication data is displayed at the display unit 22 of the portable terminal 1, so that by reading this bar code image by the bar code reader 38a of the cash register 2, the portable terminal 1 can be identified easily and accurately, and the time required since the portable terminal 1 requests the service providing until the service is actually provided can be shortened.

In particular, in this embodiment, the bar code image indicating the identification information of the portable terminal 1 and the authentication data is read by the bar code reader 38a of the specific cash register 2, so that only this specific cash register 2 can acquire the identification information of the portable terminal 1, and the security performance can be improved.

Also, in this embodiment, the link establishing and the authentication are carried out according to the connection information acquired by the bar code reader 38a or the like, and the connection is permitted only when the authentication keys coincide at both of the portable terminal 1 and the cash register 2, so that only the desired portable terminal 1 can receive the services provided by the cash register 2.

Also, there is no possibility for the register operator to take the specification of the portable terminal 1 incorrectly, so that the sure connection establishing becomes possible. Moreover, the procedure of the terminal search of the Bluetooth that requires some processing time is not executed, so that various services can be provided without obstructing the originally intended operation of the register.

Also, the customer information such as the purchase log of each customer can be collected in correspondence to the identification information of the portable terminal 1 acquired for the purpose of the radio transmission path set up, so that it is possible to carry out the purchased product sales management, the inventory management, and the analysis of the preferences of each customer by using this purchase information, and it becomes possible to provide different services to different customers.

Note that the method for exchanging the connection information between the portable terminal 1 and the cash register 2 is not limited to any particular method, and it is possible to use various methods such as a method for reading the bar code by the bar code reader 38a, a method for transmitting the connection information by radio from a radio tag provided at the portable terminal 1, a method for transmitting the connection information by the IrDA (Infrared Data Association) communication, a method for reading the identification information such as the bar code by an imaging element, etc.

Also, the one-dimensional bar code is used in the embodiment described above, but it is also possible to use the two-dimensional bar code. In this case, there is no need to contract the 48 bits Bluetooth identifier and the number of bits of the authentication data can be increased, so that the security performance can be improved further. Also, if the acquisition of the Bluetooth clock of the own terminal is possible, this information can be included, such that the estimation of the frequency of the portable terminal 1 at a time of the connection request becomes correct and the connection becomes possible in an even shorter time.

Also, the link level authentication function is used for the authentication of the correspondent terminal in this embodiment, but in the case of using OBEX, the acquired authentication data can be used as the authentication key either directly or by carrying out some calculation. In the case of OBEX, the authentication in the challenge and response style using the hash function MD5 becomes possible.

Else, the same effect can be obtained by utilizing the authentication key of the original authentication scheme directly or as a seed for producing the authentication key, rather than using the authentication scheme of MD5 which is standard for OBEX.

In this embodiment, the one-dimensional bar code is used and the correspondent Bluetooth address is contracted. In such a case, there is a possibility for the authentication error to occur when the PIN input is made and the link key is produced. This can be prevented by producing the link key as a unit key.

Note that, in the embodiment described above, the cash register 2 carries out the discount based on the electronic-coupon and the issuance of the electronic points, but it is also possible to execute such a processing at a computer connected and capable of carrying out communications with the cash register 2 through a network.

Fifth Embodiment

Contrary to the fourth embodiment, the fifth embodiment presumes the case where the connection is made from the portable terminal 1 to the cash register 2, that is the case where the portable terminal 1 is a master and the cash register 2 is a slave.

Figure 18:
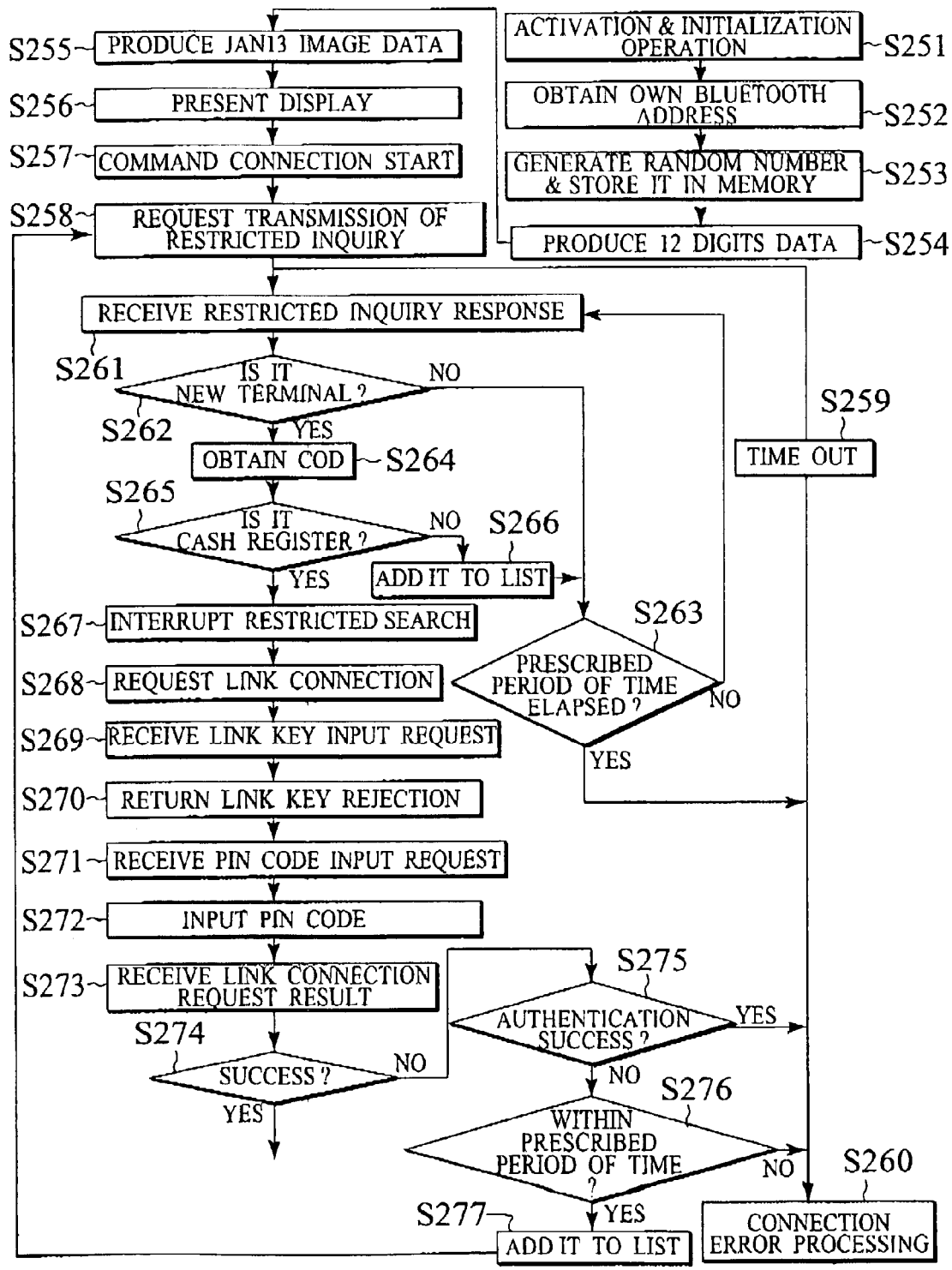
FIG. 18 is a flow chart showing an exemplary processing operation of a portable terminal according to the fifth embodiment of the present invention.
Figure 19:
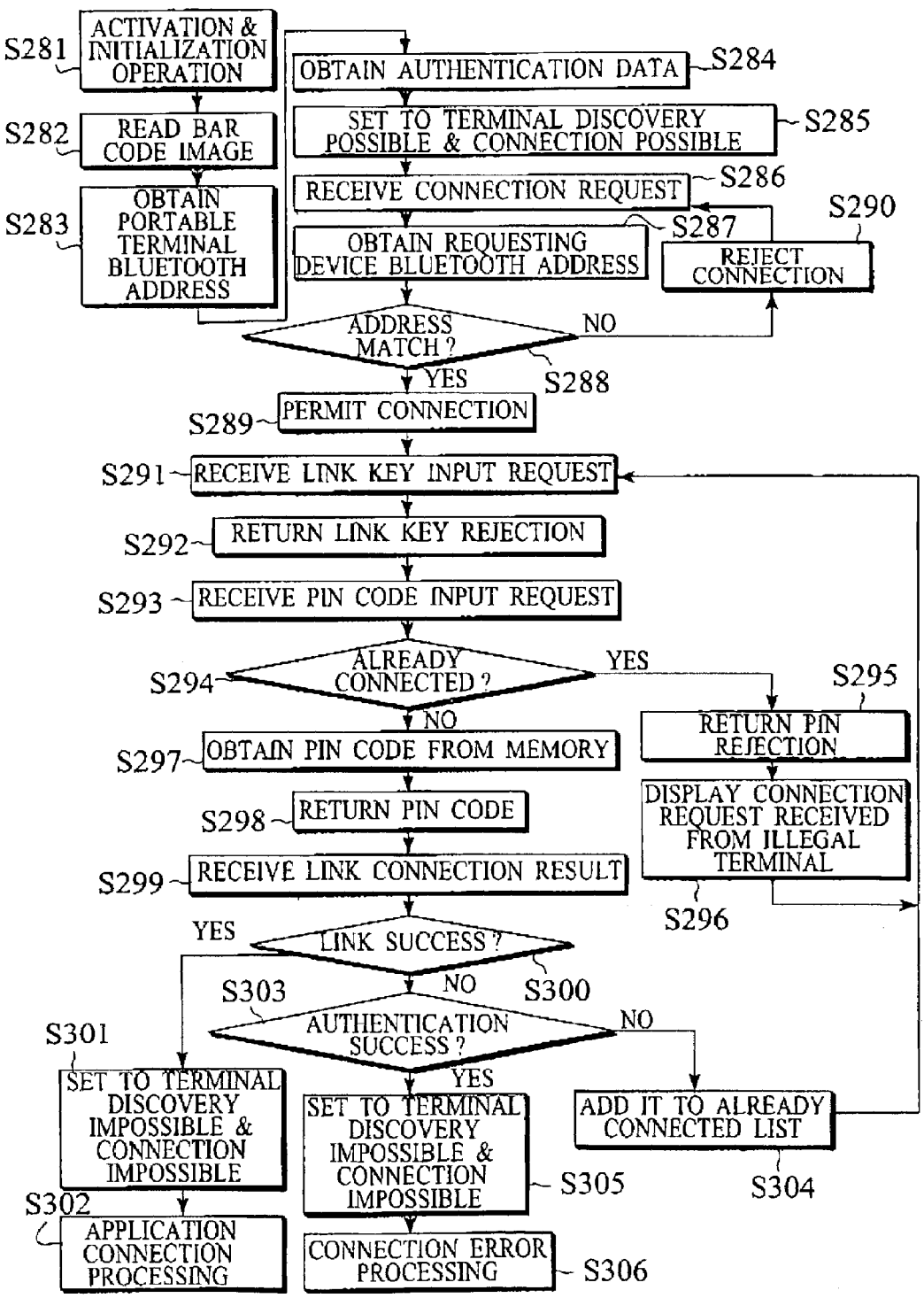
FIG. 19 is a flow chart showing an exemplary processing operation of a cash register according to the fifth embodiment of the present invention.

FIG. 18 shows an exemplary processing operation of the portable terminal 1 in the fifth embodiment, and FIG. 19 shows an exemplary processing operation of the cash register 2 in the fifth embodiment. In the following, the differences from the fourth embodiment will be mainly described.

The portable terminal 1 produces the bar code image which is the connection information (step S255), and presents this bar code image at the display unit 22 of the portable terminal 1 (step S256). The terminal owner confirms the bar code image displayed at the display unit 22 of the portable terminal 1, and presents the display unit 22 of the portable terminal 1 to a reading portion of the bar code reader 38a of the cash register 2.

The cash register 2 carries out the reading of the bar code image which is the connection information, by using the bar code reader 38*a* (step S282). When the reading succeeds, the connection information acquisition success may be notified to the terminal owner by generating the alarm sound or displaying the message indicating the reading success on a display screen.

When the connection information acquisition success is confirmed, the terminal owner makes the connection start command of the Bluetooth (step S257), and makes the restricted inquiry transmission request by setting a specific IAC (step S258). When the new terminal is discovered, the inquiry is interrupted, and the connection request is made to the discovered terminal. Then, the status of the connection request result is checked, and if it is success, the connection of L2CAP is made, whereas if it is failure, the address of this device is recorded as the already known terminal, and the inquiry is made again to carry out the search of the other device (steps S259 to S275).

When the acquisition of the connection data by the bar code reader 38*a* succeeds (step S284), the cash register 2 validates the inquiry scan and the page scan (step S285), acquires the information corresponding to the 32 bits of the correspondent Bluetooth device from the acquired 13 digits number, and converts it into 4 bytes sexadecimal notation (step S287).

When the link level connection request event of the Bluetooth is received, the Bluetooth address of the device that made the connection request is acquired, and the comparison of the lower four bytes is made (step S288). When the addresses coincide, the connection permission is made (step S289). When the addresses do not coincide, the connection rejection is made (step S290).

When the link connection succeeds, the inquiry scan and the page scan are invalidated (steps 5291 to S304).

Also, in the case of carrying out the authentication, the processing similar to the fourth embodiment is carried out. In the flow chart of FIG. 19, the device that makes the connection request is identified by using the lower four bytes of the Bluetooth address, but it is also possible to make the judgement of the portable terminal 1 by using only the lower three bytes of the Bluetooth address of the portable terminal which is a unique ID. In this case, the probability for the portable terminals having the identical ID to make the connection requests at the identical location at the identical timing is less than or equal to one 16,800,000-th, so that this probability can be effectively ignored.

As described, in the fifth embodiment, when the portable terminal 1 discovers the inappropriate device before the desired device, the time of several hundred milli-seconds is required for the re-connection, but the number of digits of the terminal identification information can be reduced, and the reduced part can be used for the transmission of the information for the authentication, so that it is inferior in terms of the connection time but it is superior in terms of the security strength, compared with the fourth embodiment.

Note that, in each embodiment described above, the services to be provided by the cash register 2 to the portable terminal 1 are not limited to any specific services. Namely, the device that carries out the communications with the portable terminal 1 is not limited to the cash register 2.

In each embodiment described above, the cash register 2 is described as an exemplary information exchange device for carrying out communications with the portable terminal 1, but the present invention is applicable to various devices capable of carrying out communications with the portable terminal 1 for transmitting and receiving the connection information, such as a ticket gate machine for carrying out the ticket examination processing by carrying out communications with the portable terminal 1, an automatic vending machine, a gate of the parking lot or the facility, etc.

Recently, the portable terminal equipped with an imaging device such as a CCD camera is becoming popular, and by using this type of the portable terminal 1, the information displayed at the display unit 37 of the cash register 2 can be easily taken into the portable terminal 1 as an image.

For this reason, contrary to the fourth and fifth embodiments described above, it is also possible to realize a modified embodiment in which the cash register 2 generates a two-dimensional image according to the Bluetooth address of the cash register 2 and the PIN code and displays it on the display unit 37 of the cash register 2, this two-dimensional image is imaged by the imaging device of the portable terminal 1 to acquire the connection information of the cash register 2, and the connection request is made from the portable terminal 1 side or from the cash register 2 side.

Even in this case, the same effects as the fourth and fifth embodiments described above can be obtained.

As described above, according to the present invention, the identification code generated at one of the first and second communication devices is presented to the other, and the authentication data are generated by using this identification code at the both of the communication devices, so that the illegal acquisition of the identification code can be prevented and the security performance can be improved.

Also, according to the present invention, the connection information is transmitted as the second communication device acquires the identifier for presentation that is displayed at the display unit of the first communication device, so that the connection to the desired communication device can be made easily and surely, and the security performance can be improved further.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication system comprising:
   a communication device; and
   a portable terminal for carrying out communications by setting up a communication link between the communication device and the portable terminal,
   wherein the communication device has:
      a first identifier acquisition unit configured to acquire a first identifier for communication possessed by the communication device;
      a first identifier generation unit configured to generate an identifier for presentation according to at least a part of bits of the first identifier for communication for identifying the communication device;
      a display unit; and
      a display control unit configured to display the identifier for presentation on the display unit, and
   the portable terminal has:
      an imaging device;
      a second identifier acquisition unit configured to acquire the identifier for presentation from an image generated by imaging the identifier for presentation displayed on the display unit by means of the imaging device;

a second identifier generation unit configured to generate a second identifier for communication including at least the part of bits of the first identifier for communication for identifying the communication device according to the identifier for presentation acquired by the second identifier acquisition unit; and a connection request unit configured to make a connection request to the communication device according to the second identifier for communication generated by the second identifier generation unit.

2. The communication system of claim 1, wherein each one of the communication device and the portable terminal has:

an authentication unit configured to carry out an authentication processing by generating authentication data for authenticating each other according to the identifier for presentation.

3. The communication system of claim 2, wherein each one of the communication device and the portable terminal has:

a warning unit configured to warn an occurrence of an illegal access when authentication by the authentication unit fails.

* * * * *